US006788398B1

(12) United States Patent
Guttman

(10) Patent No.: US 6,788,398 B1
(45) Date of Patent: Sep. 7, 2004

(54) FAR-FIELD SCANNING APPARATUS AND METHOD FOR RAPID MEASUREMENT OF LIGHT SOURCE CHARACTERISTICS WITH HIGH DYNAMIC RANGE

(75) Inventor: Jeffrey L. Guttman, Los Gatos, CA (US)

(73) Assignee: Photon, Inc., San Jose, CA (US)

( * ) Notice: Subject to any disclaimer, the term of this patent is extended or adjusted under 35 U.S.C. 154(b) by 168 days.

(21) Appl. No.: 09/699,253

(22) Filed: Oct. 27, 2000

Related U.S. Application Data

(60) Provisional application No. 60/163,226, filed on Nov. 3, 1999.

(51) Int. Cl.$^7$ .................................................. G01J 1/00
(52) U.S. Cl. .................. 356/121; 356/226; 356/139.04; 356/141.2; 250/206.2
(58) Field of Search ................................ 356/121, 225, 356/226, 139.04–139.08, 141.1–141.5, 152.1–152.3; 250/206.1, 206.2

(56) References Cited

U.S. PATENT DOCUMENTS

| | | | | |
|---|---|---|---|---|
| 3,931,515 | A | * | 1/1976 | Parkin ........................ 250/216 |
| 3,999,864 | A | | 12/1976 | Mutter |
| 4,171,911 | A | | 10/1979 | Aberle et al. |
| 4,285,597 | A | | 8/1981 | Lamprecht et al. |
| 4,344,709 | A | | 8/1982 | Provder et al. |
| 4,636,980 | A | * | 1/1987 | Bluzer ........................ 365/106 |
| 5,253,036 | A | | 10/1993 | Ashdown ..................... 356/121 |
| 5,499,094 | A | * | 3/1996 | Swierczek ................... 356/121 |
| 5,949,534 | A | | 9/1999 | Guttman et al. ............. 356/121 |

FOREIGN PATENT DOCUMENTS

| | | | |
|---|---|---|---|
| WO | WO 96/13709 | 5/1996 | .......... G01N/21/27 |

OTHER PUBLICATIONS

Young, M., "Mode–field diameter of single–mode optical fiber by far–field scanning," *Applied Optics*, 37(24):5605–5619, Aug. 20, 1998.

* cited by examiner

*Primary Examiner*—Richard A. Rosenberger
*Assistant Examiner*—Vincent P. Barth
(74) *Attorney, Agent, or Firm*—Finnegan, Henderson, Farabow, Garrett & Dunner, L.L.P.

(57) ABSTRACT

A method and apparatus for rapid measurements of far-field radiation profiles having a large dynamic range from an optical source is disclosed. Some embodiments of the apparatus include a collector coupled to a rotating hub so that the rotation of an entrance to the collector defines a plane, a detector coupled to receive light captured at the entrance to the collector, and detector electronics having a programmable gain coupled to receive a signal from the detector, Some embodiments may include a rotatable entrance mirror for reflecting light from the optical source into the plane of the entrance of the collector. In some embodiments, the optical source is fixed relative to the plane of the entrance of the collector. In some embodiments, the optical source is rotatable in the plane defined by the entrance of the collector. In some embodiments, the source can be an optical fiber. In some embodiments, the source can be a material irradiated by a laser. In order to obtain a large dynamic range, far-field data from the optical source is taken at a number of gain settings of the detector electronics and a compiled far-field radiation profile is constructed. Characterizing parameters for the optical source, such as fiber parameters for an optical fiber, can be calculated based on the compiled far-field radiation profile.

31 Claims, 18 Drawing Sheets

Microfiche Appendix Included
(1 Microfiche, 17 Pages)

FAR-FIELD SCANNING APPARATUS AND METHOD FOR RAPID MEASUREMENT OF LIGHT SOURCE CHARACTERISTICS WITH HIGH DYNAMIC RANGE

RELATED APPLICATIONS

This application is related to provisional application Ser. No. 60/163,226, entitled "Compact Far-Field Scanning Apparatus and Method for Rapid Measurement of Optical Fiber Parameters," filed Nov. 3, 1999, by Jeffrey L. Guttman, herein incorporated by reference in its entirety.

CROSS REFERENCE TO MICROFICHE APPENDIX

Appendix A, which is a part of the present disclosure, is a microfiche appendix consisting of 1 sheets of microfiche having 17 frames. Microfiche appendix A includes a software program operable in a computer of a goniometric radiometer as described below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

This and other embodiments are further described below.

BACKGROUND

1. Field of the Invention

The present invention relates to testing or characterization of light sources and, in particular, to the scanning and acquisition of far-field data from light sources, including optical fibers.

2. Discussion of Related Art

Conventional techniques for measuring or characterizing the radiation pattern of optical sources utilize a goniometer in combination with an optical detector. These "gonioradiometric" measurements are typically made by rotating the detector on a radial arm of the goniometer about the optical source (light source) to be measured. The detector scans through angles and measures light output as a function of angle. In accordance with another conventional technique, a light source is mounted to a rotating goniometer which scans the optical beam from the light source across a detector that is fixed in position. The mechanical scanning apparatus associated with the above-described known techniques often occupy a rather large volume due to the necessity of scanning at specified radii which are on the order of tens of centimeters or larger in some cases. In addition, the mechanical scanning apparatus typically does not allow for rapid positioning. This results in lengthy scan times, often as much as thirty minutes or more per individual scan. This translates to characterization times on the order of hours or days for a fill incremental scan of the radiation pattern of the source.

The fiber optic community needs a method for both fast and accurate measurement of optical fiber parameters. With advances in dense wavelength division multiplexing (DWDM) technology, the role of optical fibers is ever more demanding. With the increased deployment of standard fibers and the development of specialty fibers on the rise, the need to accurately characterize these fibers in greater numbers is paramount.

Two parameters of significant importance for predicting fiber optic system performance are the Mode-Field Diameter (MFD) and the Effective Area ($A_{eff}$). The MFD is used to evaluate losses due to mismatch at connections of fibers and fiber components, while $A_{eff}$ is used to assess nonlinear effects. Determining these parameters from far-field radiation profile data has been specified as the reference method by the Telecommunication Industry Association/Electronic Industries Association (TIA/EIA). The accurate measurement of fiber parameters such as the Mode-Field Diameter (MFD) and Effective Area ($A_{eff}$) of single-mode optical fiber by the Direct Far-Field Method requires a system with dynamic range of at least 50 dB if not greater.

Requirements for measuring the Bidirectional Reflectance Distribution Function (BRDF) and the Bidirectional Transmittance Distribution Function (BTDF) of a scatterometer are even more demanding, with from approximately 90 to 120 dB of dynamic range needed.

To accomplish the dynamic ranges necessary for accurate measurements of fiber parameters or scatterometer data (BRDF or BTDF), conventional measurements utilize a single far-field scan with lock-in amplifier techniques and amplifier gain switching during the scan. These methods provide wide dynamic ranges, but typically results are obtained in times on the order of 30 minutes or more.

Therefore, there is a need for an apparatus and method for quickly measuring the far-field radiation profiles with high dynamic ranges from scatterometer sources, optical fibers, or other light sources.

SUMMARY

In accordance with the present invention, an apparatus and method is presented for measuring the far-field radiation pattern around a light source. In some embodiments, the light source may be an optical fiber, in which case optical fiber parameters may be calculated from the measurement of the far-field radiation pattern. In some embodiments, the far-field radiation pattern is from a scatterometer source. In general, the optical source can be any source of radiation.

Some embodiments of the apparatus include a collector, a detector coupled to a detector electronics having a programmable gain, a motion controller for controlling the scanning of the collector, and a data acquisition computer. Some embodiments further include a radiation deflector (usually in the form of an entrance aperture mirror). The entrance aperture mirror deflects light from the light source to an entrance end of the collector. The collector is mounted to a cylindrical hub that is caused to rotate about the optical axis of the light source in a fashion controlled by the motion controller. In some embodiments, the light source can be rotated in order that a more three-dimensional scan of the far-field radiation profile can be obtained.

The collector is arranged to receive a scan of the radiation profile from the optical source as the entrance to the collector is rotated on the cylindrical hub in a plane around the optical source. In some embodiments, the optical source is fixed relative to the collector so that the collector scans through a plane intersecting with the radiation profile of the light source. In some embodiments, the light source can be rotated so that multiple scans of data corresponding to scans through multiple planes intersecting with the radiation profile of the light source is obtained. A three-dimensional radiation profile can be measured by obtaining scans through multiple planes intersecting with the radiation profile from the light source. In some embodiments, the light source is rotated with a positioning motor. In some embodiments, the entrance aperture mirror is rotated relative to the source so that individual intersecting planes of data are reflected into the plane defined by the rotation of the entrance to the collector. The entrance aperture mirror effectively selects a slice through the radiation pattern of the optical source being measured and the rotating collector scans through the light reflected by the entrance aperture mirror at that azimuthal slice and delivers it to the detector.

In embodiments with an entrance aperture mirror, the entrance aperture mirror can be rotatable about the optical axis of the optical source being measured. A step wise rotation of the entrance aperture mirror through 180° is effective to characterize the entire three-dimensional radiation profile of the optical source. In some embodiments of the invention, the entrance aperture mirror is mechanically coupled to a stepper or servo motor and is controllably positioned by a motor controller, which is controlled by the data acquisition computer.

In some embodiments of the invention, the optical source is fixed relative to the plane traversed by the entrance aperture of the collector as it is rotated on the hub. In these embodiments, the apparatus collects data through one plane of the radiation profile from the light source. In some embodiments of the invention, the optical source can be rotated about a direction in the data collection plane defined by the rotation of the entrance to the collector. In that case, data taken from different rotational positions of the optical source represents data taken in different planes through the radiation profile of the light source.

In some embodiments of the present invention, the collector comprises an optical light fiber or a bundle of fibers. In another embodiment of the invention, the collector comprises a train of reflectors mounted in diametrically opposed fashion inside the rotating cylinder. The reflectors fold the optical path of the reflected light and thus increase the effective radius of measurement so that large radius scans can be obtained in a measuring instrument of compact geometry with dimensions on the order of tenths of meters.

In some embodiments, the collector has an exit end optically arranged in co-alignment with the axis of rotation of the rotating hub and separated from the detector by a small air gap. In some embodiments, the detector is included in the collector and rotates on the hub with the collector. The detector receives light from the collector and outputs a signal to the detector electronics. The detector electronics includes amplifiers and has an overall gain which is programmable by the data acquisition computer. The detector electronics is coupled to the data acquisition computer. In order to perform measurements over the entire dynamic range, the data acquisition computer accumulates and combines data from various settings of the gain of the detector electronics. The acquisition and combination of data from separate scans at each particular position of the light source relative to the collector from different gain settings allows acquisition of far-field profiles with dynamic ranges greater than could be obtained with any individual setting.

In some embodiments of the invention, the data-acquisition computer collects a set of averaged far-field radiation profile scans. Each scan in the set of averaged scans is taken with a corresponding gain setting of the detector electronics. An average scan for a particular gain setting is the average of a pre-selected number of individual scans at that gain setting. A set of averaged scans includes averaged scans for a number of selected gain settings of the device electronics.

A compiled far-field radiation profile in a particular plane of the radiation profile can be constructed from the set of averaged scans. In some embodiments, data from the scan corresponding to the lowest gain setting which has a value above a threshold value is utilized as the data for the compiled far-field radiation profile in the range of $\theta_{1-}$ to $\theta_{1+}$. Data from scans corresponding to higher gain settings which have a value above a threshold is then utilized to fill in the data for the compiled far-field radiation profile. For example, the data above the threshold value from the next lowest gain setting is utilized as data in the ranges $\theta_{2-}$ to $\theta_{1-}$ and $\theta_{1+}$ to $\theta_{2+}$ of the compiled far-field radiation profile and the scan from the next higher gain setting provides data for the range $\theta_{3-}$ to $\theta_{2-}$ and $\theta_{2+}$ to $\theta_{3+}$. The data acquisition computer, then, constructs the compiled far-field radiation profile from regions of the averaged scans of the set of averaged scans having data values above a threshold value.

A three dimensional scan of the radiation profile from the light source can be constructed by obtaining a compiled far-field profile in several planes through the radiation profile. The compiled far-field profile in each plane is constructed from multiple averaging scans in that plane with differing gain settings.

In some embodiments, the compiled far-field radiation profile is utilized to determine Mode Field Diameter (MFD), Effective Area ($A_{eff}$) and numerical aperture (NA) of optical fibers. Other fiber parameters may also be calculated based on the compiled far-field radiation profile from an optical fiber light source.

In some embodiments, the light source is the reflection or transmission of light through a material under test. In measurements of Bidirectional Scatter Distribution Functions (BSDF), the radiation profile of light reflected from the surface of a material or transmitted through the material from a laser beam incident on the material provides information regarding the material. In a Bidirectional Reflectance Distribution Function (BRDF) the reflectance radiation profile from the surface of a material around an incident laser beam is measured. In a Bidirectional Transmittance Distribution Function (BTDF) the transmission radiation profile through the material around an incident laser beam is measured. The radiation profile of light transmitted through the material from a laser beam incident on the material also provides information regarding the material. In some embodiments of the invention, both BTDF and BRDF data can be measured in a single scan.

These and other embodiments according to the present invention are further described below with reference to the following figures.

BRIEF DESCRIPTION OF THE FIGURES

FIGS. 7b through 7e show operation of the embodiment of goniometric scanning radiometer shown in FIG. 7a.

In the figures, elements having the same designation in different figures have the same functional purpose.

DETAILED DESCRIPTION

In accordance with the present invention, a goniometric scanning radiometer that can be utilized for rapidly scanning the far-field radiation profile of optical sources is disclosed. Some aspects of the goniometric scanning radiometer according to the present invention have been previously disclosed in U.S. Pat. No. 5,949,534 to Guttman et al., assigned to the assignee of the present invention, herein incorporated by reference in its entirety.

Figure 1:
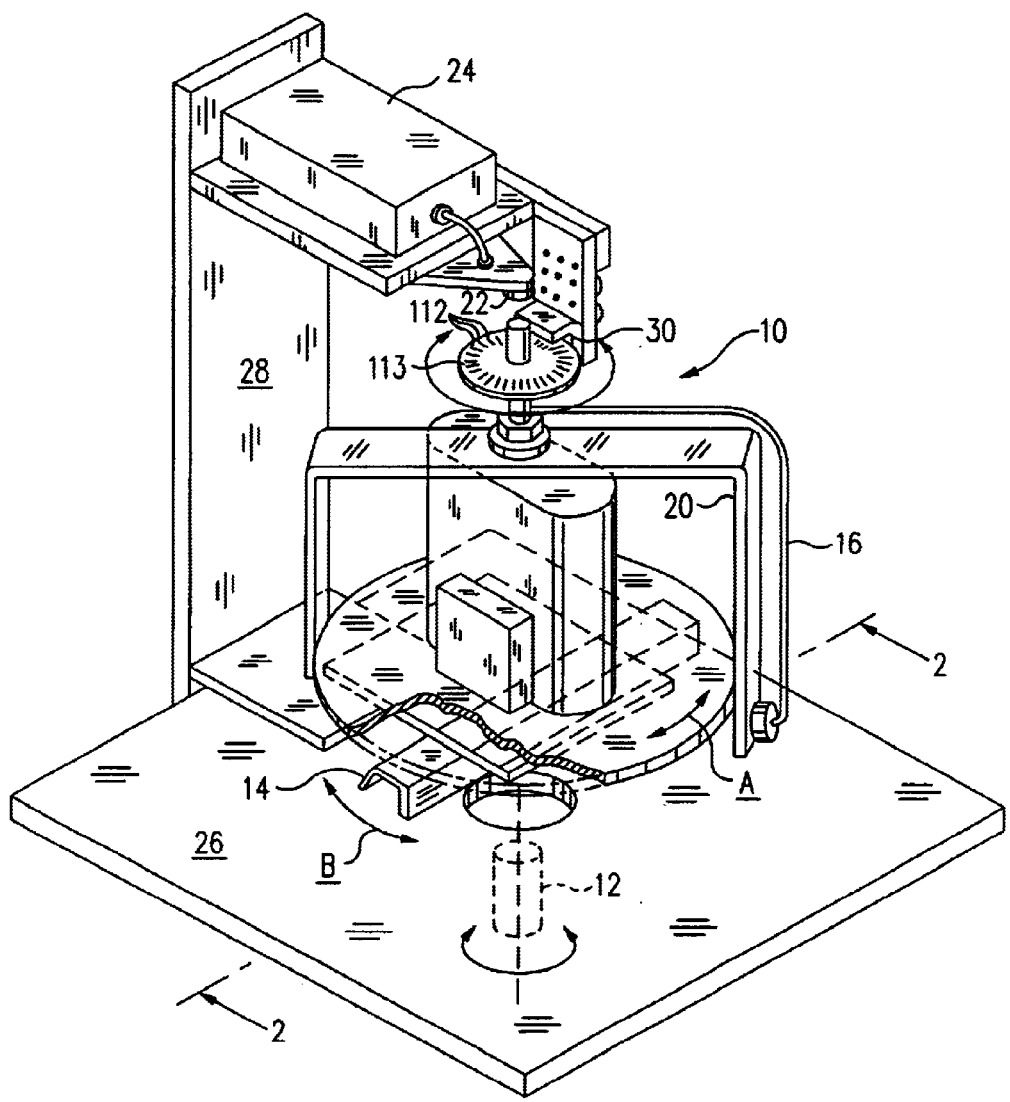
FIG. 1 shows an isometric view of an embodiment of a goniometric scanning radiometer according to the present invention.
Figure 2A:
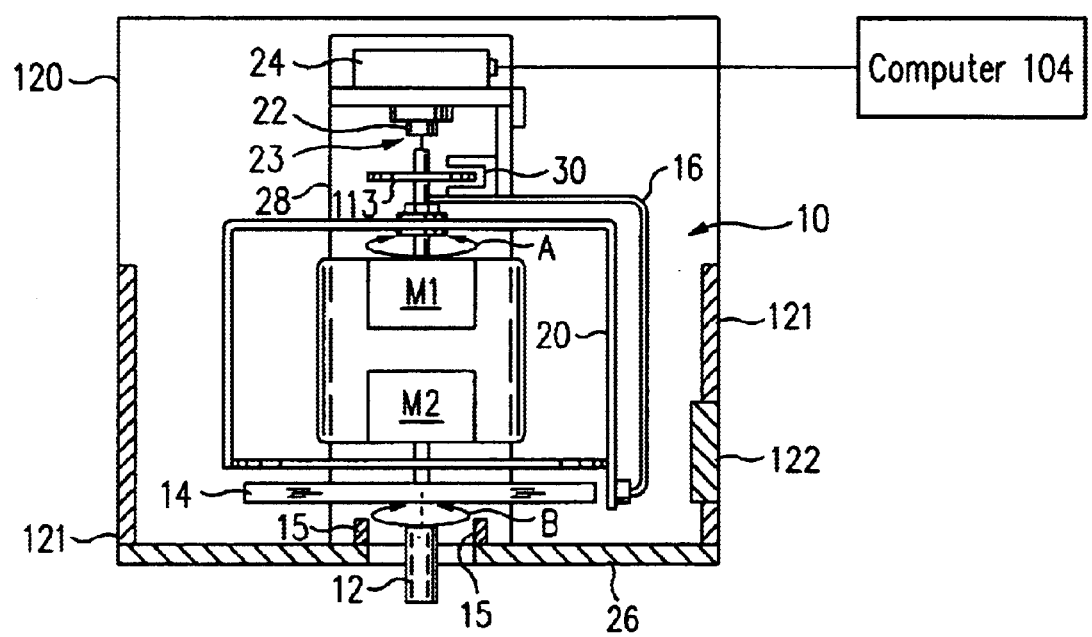
FIG. 2a shows a cross section of the embodiment shown in FIG. 1 taken along the line and in the direction of arrows 2-2.

FIGS. 1 and 2a show an isometric view and a cross sectional view, respectively, of an embodiment of goniometric scanning radiometer 10 according to the present invention. Scanning radiometer 10 of FIGS. 1 and 2a includes a radiation deflector 14, or aperture mirror 14, that deflects a cross-section of the radiation profile from optical source 12 into a plane defined by the rotation of the entrance to collector 16. Optical source 12 can be any source of radiation, including optical fiber, transmitted or reflected light from a laser source, an LED, a laser source, or any other source. Depending on the type of radiation emitted by source 12, radiation deflector 14 can be crystals or multi-layer mirrors (suitable for scattering x-ray sources) or mirrors (for optical sources). A collector 16, which for optical radiation can include an optical fiber, an optical fiber bundle, or a mirror train, collects radiation deflected from radiation deflector 14. In FIGS. 1 and 2a, collector 16 is shown as an optical fiber or optical fiber bundle. A radiation baffle 15 can be utilized to block the direct path between optical source 12 and collector 16 so that only light reflected from the entrance aperture mirror 14 is collected by the lower or entrance end of collector 16.

Collector 16 is mounted to rotatable hub 20. A first motor M1 rotates hub 20 and collector 16 about the central axis of optical source 12 as indicated by directional arrow A-A. This rotation enables collector 16 to scan through the optical beam reflected by entrance aperture mirror 14 and collect light energy emanating in multiple directions from optical source 12. Motor M1 may be operated in a continuous fashion or in a sequential or step-wise fashion as desired. A second motor M2, which can be a stepper motor or servo motor, rotates entrance aperture mirror 14 in incremental steps about the central axis of optical source 12 as indicated by direction arrows B-B. Motors M1 and M2 are supported on stationary platform 26. Both optical source 12 and detector 22 in the embodiments shown in FIGS. 1 and 2a are stationary. In FIGS. 1 and 2a, detector 22 is mounted on an extension of upright support member 28. In some embodiments, detector 22 may form part of collector 16. Encoder signals from entrance aperture mirror stepper motor M2 and the angular position encoder 30 of rotating cylindrical hub 20 are compared in computer 104 to ensure registration between motors M1 and M2.

In the embodiments shown in FIGS. 1 and 2a, the upper or exit end of collector 16 is positioned so that it is coaxial with the rotation axis of cylindrical hub 20. The optical signal at the exit end of collector 16 is incident on detector 22. A small air gap separates the exit end of collector 16 from detector 22. This arrangement forms an optical commutator 23 (see FIG. 2a). Optical commutator 23 allows transmission over a single channel sampling of light emanating from multiple directions from optical source 12 by rotating collector 16 with respect to entrance mirror 14. Detector 22 converts the optical signal from collector 16 to an electrical signal which is amplified in detector electronics 24. In some embodiments, detector electronics 24 includes filters and amplifiers, including one or more gain controllable amplifiers, for receiving the electrical signal from detector 22. Additionally, detector electronics 24 can include motor controls for controlling motors M1 and, in some embodiments, M2.

The orientation of entrance aperture mirror 14 with respect to source 12 determines the azimuth angle for the scan measurement. For each azimuth angular position of entrance aperture mirror 14, collector 16 measures the angular dependent energy distribution from the source beam at the present azimuth angle. Rotating the entrance aperture mirror 14 through a series of angles in the range from 0° to 180° facilitates the measurement of the complete three-dimensional far-field radiation pattern of source 12. The total scan angle for a given azimuth angle is a function of the distance between source 12 and entrance aperture mirror 14, and of the extent (length) of the entrance aperture mirror 14. Scan angle ranges of greater than 175° (±87.5°) are easily achieved by embodiments of the present invention. In the embodiment shown in FIGS. 1 and 2a, the effective radius of the scan is equal to the distance between collector 16 and source 12 as reflected from entrance mirror 14.

In some embodiments of the present invention, as shown in FIG. 2a, scanning radiometer 10 includes a cover 120 which is positioned over radiometer 10 and can be fastened to stationary platform 26. Cover 120 protects radiometer 10 from elemental contamination (e.g., dust and water) as well as reducing the amount of stray light incident on the entrance end of collector 16. In some embodiments, cover 120 can be lined with an optical absorber material 121 such as Edmund Black felt from Edmund Scientific. Optical material 121 can be placed on the interior surface of cover 120 so that scattered light is absorbed before it can be reflected into the entrance end of collector 16. In some embodiments, an additional optical absorber 122 can be placed on the interior of cover 120 in the direction of propagation from source 12 so that light from source 12 is absorbed. Optical absorber 122 can be an optical "get lost" path, which can take the form of an exit hole placed in cover 120, or a high absorption material, such as a carbon filer based material which has very large absorption characteristics in the typical wavelengths of source 12. Reducing the amount of scattered light incident on the entrance to collector 16 increases the ability to obtain higher dynamic ranges for radiation profile measurements with a dimensionally small radiometer.

Figure 2B:
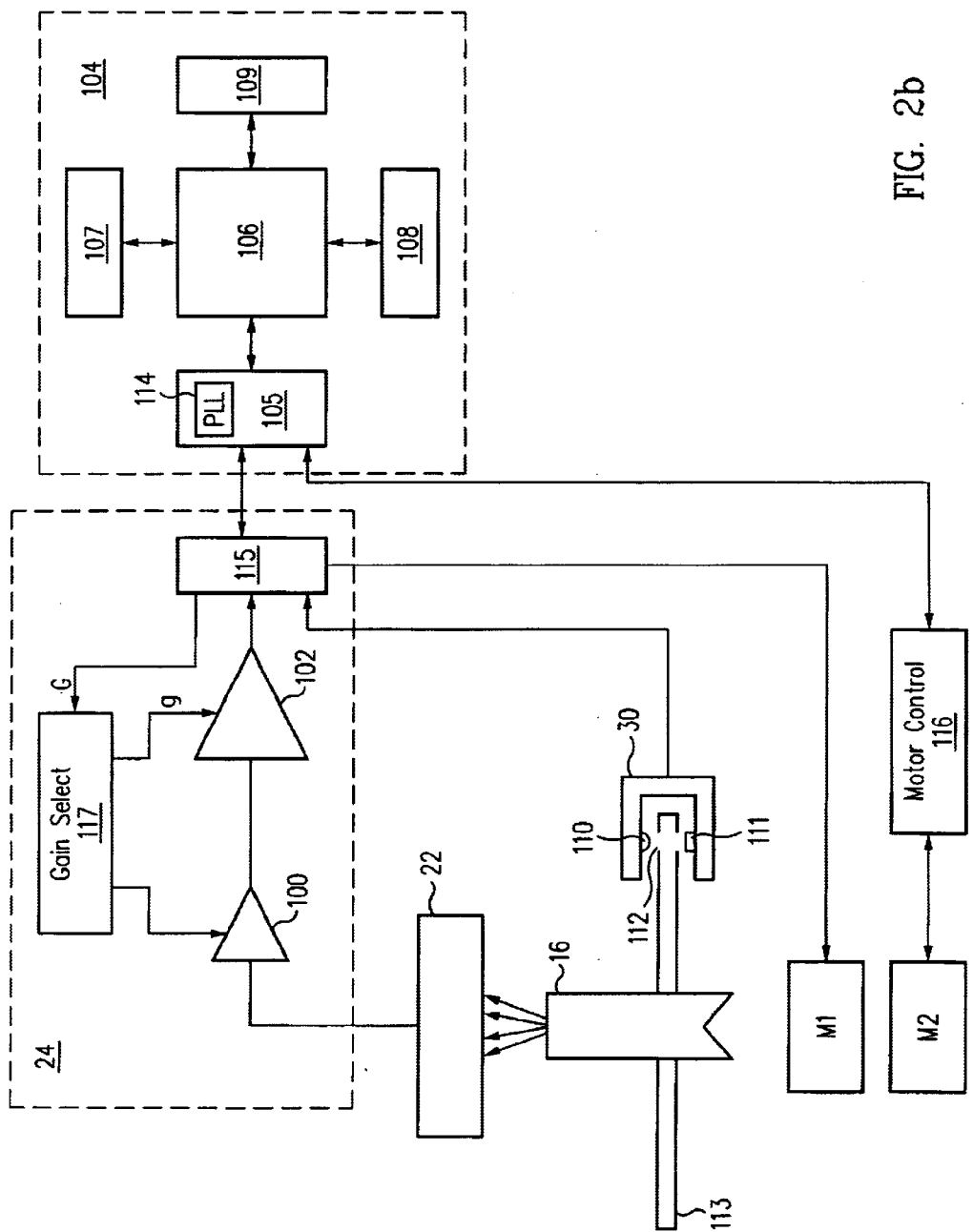
FIG. 2b shows an embodiment of the detector electronics for a goniometric scanning radiometer according to the present invention.

FIG. 2b shows an embodiment of detector electronics 24 and other control electronics according to the present invention. As shown in FIG. 2b, light from collector 16 is captured by photodetector 22. Photodetector 22 can be any device for converting an optical signal into an electrical signal. In some embodiments of the invention, photodetector 22 is a InGaAs detector, for example the Fermionics FD 3000W.

The output signal from photodetector 22 is received by device electronics 24. In some embodiments, device electronics 24 includes a transimpedance amplifier 100 followed by a programmable voltage amplifier 102. Device electronics 24 further includes an interface 115 and a gain select 117. In some embodiments, gain select 117 receives a digital gain select signal from computer 104 through interface 115 and selects the analog gains for both amplifiers 100 and 102 to obtain the desired programmed overall gain for device electronics 24. In some embodiments, the overall gain of device electronics 24 is programmable in a range from 0 to 139 dB of gain.

The amplified signal from programmable voltage amplifier 102 is input to data acquisition computer 104 as data. Data acquisition computer 104 is also coupled to control and monitor motors M1 and M2 so that data arriving from device electronics 24 is registered with the relative angular positions of motors M1 and M2, as described above.

In some embodiments, an optical encoder 30 is coupled to a phase-locked-loop 114 in order to provide control signals for controlling motor M1. As shown in FIG. 2b, phase-locked-loop 114 may be included in computer 104 and the signals from optical encoder 30 and the control signals to motor M1 can be communicated between device electronics 24 and computer 104 through interface 115. The output signals from optical encoder 30 may be coupled through interface 115 to computer 104. Encoder 30 can include an optical source 110 where light is detected by detector 111 when access 112 in disk 113 is between source 110 and detector 111. Disk 113 can have any number of accesses 112. The signal from detector 111 is input to phase-locked-loop 114 along with a reference signal generated by computer 104. Phase-locked-loop 114 generates a signal related to the phase difference between the signal from detector 111 and that generated by computer 104. The signal generated by phase-locked-loop 114 is then utilized by computer 104 to generate a motor control signal that controls the rotational speed of hub 20. In other embodiments, signals from encoder 30 can be generated by methods other than optical, for example, magnetically.

Motor M2 can be a stepper or servo motor controlled by a motor control 116. In some embodiments, computer 104 can directly control motor control 116 and directly selects a particular angular position of motor M2 (and therefore of source 12). In some embodiments, motor control 116 can receive a digital signal from computer 104 and generates the appropriate currents or pulses to position and hold motor M2 at the requested angular position.

Computer 104 can be any computing system capable of interfacing with gonioradiometric scanning apparatus 10. As such, computer 104 operates a program for controlling scanning apparatus 10, receiving data from device electronics 24, and displaying the results of calculations performed on that data. In some embodiments, computer 104 is a PC based system operating a MS Windows based software. As such, computer 104 includes a processor 106, a data interface 105 coupled between processor 106 and radiometer 10 for communicating with radiometer 10, a memory 107 coupled to processor 106 for storing data and programs, a storage medium 108 (such as a hard disk drive, CD ROM drive, ROM drive, or other device or combination of devices) coupled to processor 106 for storing programming and data, and a user data interface 109 (such as a monitor, touchscreen, mouse, keyboard, and other user interface device) for displaying data, calculation results, and interfacing with a user.

Figure 3B:
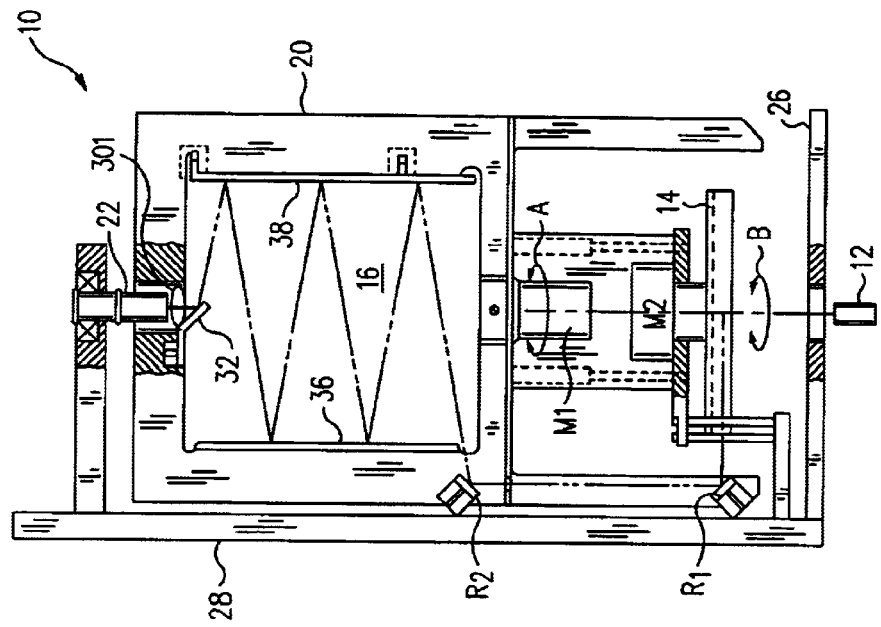
FIGS. 3a and 3b show cross sectional views of embodiments of a goniometric scanning radiometer in accordance with the present invention.
Figure 3A:
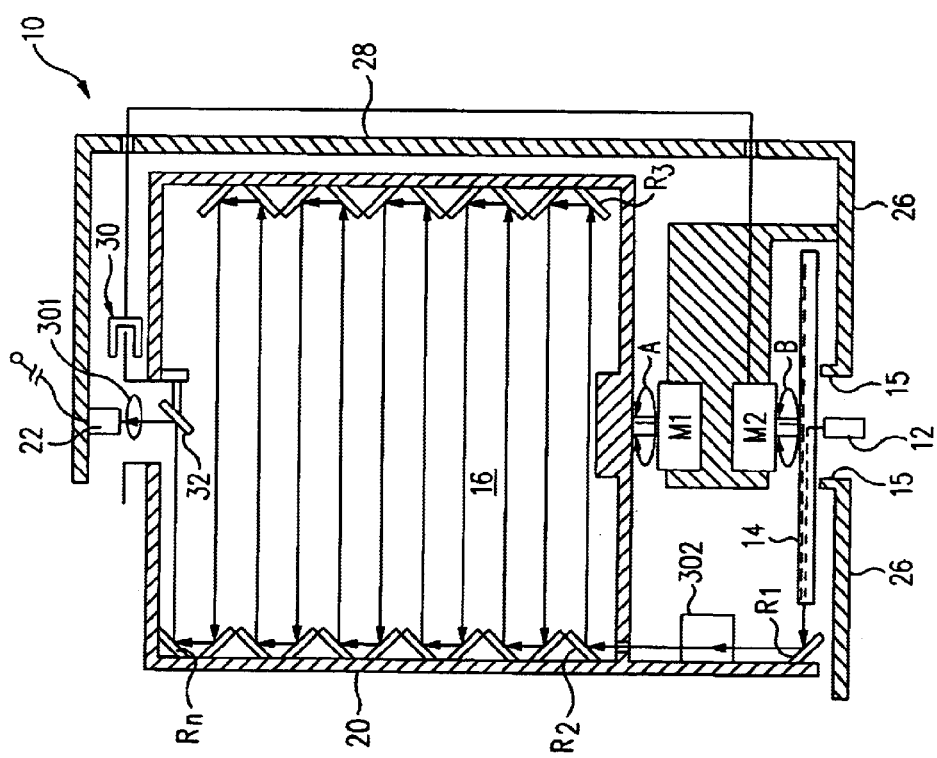

FIGS. 3a and 3b illustrate further embodiments of scanning radiometer 10 in accordance with other embodiments of the present invention. In each of scanning radiometers 10 of FIGS. 3a and 3b, collector 16 is an arrangement of mirrors (a "mirror train") instead of the optical fiber as shown in FIGS. 1 and 2.

As shown in FIG. 3a, optical collector 16 includes a train of reflectors $R_1$–$R_n$ mounted internally to rotating cylindrical hub 20. As before, light baffle 15 blocks the direct path between optical source 12 and collector 16 so that only light reflected from entrance aperture mirror 14 is collected. Furthermore, the interior of cover 120, which fits over radiometer 10, can be lined with optical absorbers and can include an optical "get lost" path or absorber to further reduce the amount of scattered light entering collector 16. Cylindrical hub 20 rotates about entrance aperture mirror 14 and scans through the optical beam deflected by entrance aperture mirror 14. In this embodiment, reflectors $R_1$ through $R_n$ are mounted diametrically opposed in such a way that light is directed back and forth across cylindrical hub 20 from the bottom end to the top end: Reflector $R_1$ reflects the beam to $R_2$, $R_2$ reflects the beam to $R_3$, and so on. Finally, reflector $R_n$ reflects the light to the final reflector in the optical train, exit mirror 32. The reflected beam from exit mirror 32 is coaxial with the rotation axis of cylindrical hub 20 and is then incident upon detector 22 positioned above rotating cylindrical hub 20. In some embodiments, a lens 301 is positioned between exit mirror 32 and photodetector 22 to focus light onto photodetector 22. Lens 301 can be a conventional lens or a GRIN lens.

In embodiments with mirror trains, the effective radius of the scan is equal to the distance traversed by the light as it is reflected through the series of mirrors. Thus, the effective radius of the scan can be much larger than the overall dimensions of the scanning apparatus when mirrors are used. For example, with 10 mirrors and a cylindrical hub diameter of 10 cm, the scan radius is greater than 1 meter. This distance can be made arbitrarily large by adding more mirrors, with the practical limit determined by source position, source intensity, mirror reflectivity, detector sensitivity, and detector bandwidth FIG. 3b illustrates a simplified variation of the mirror train of FIG. 3a wherein single flat mirrors 36 and 38 are substituted in place of plural reflectors $R_3$–$R_n$.

Figure 4A:
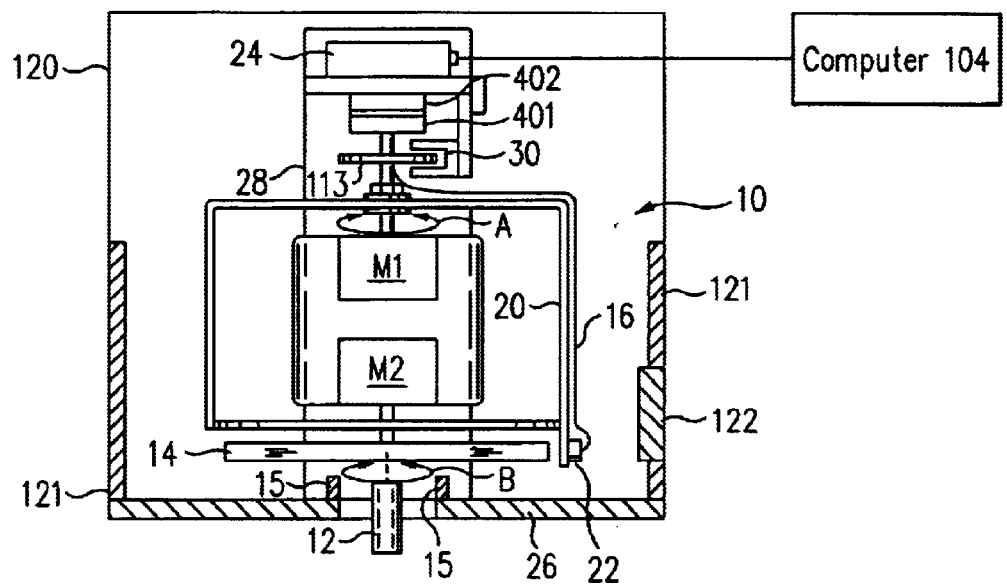
FIGS. 4a and 4b show a cross sectional view and a plan view, respectively, of another embodiment of a goniometric scanning radiometer in accordance with the present invention.
Figure 4B:
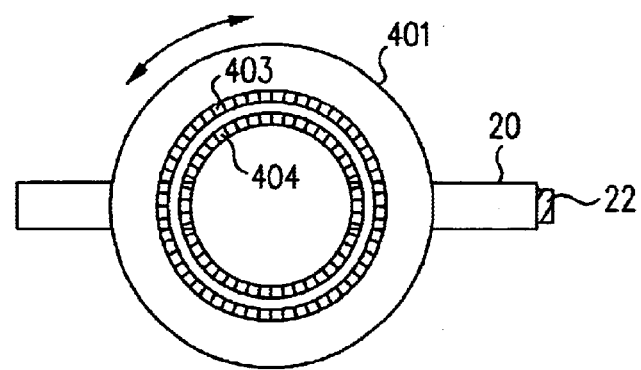

FIG. 4a shows an embodiment of radiometer 10 where detector 22 forms part of collector 16. Detector 22 is mounted to hub 20 so that the light collecting surface of detector 22 forms the entrance of collector 16. Detector 22 is electrically coupled to rotating disk 401. As shown in FIG. 4b, rotating disk 401 includes conducting strips 403 and 404 which are electrically coupled to detector 22. As shown in FIG. 4a, rotating disk 401 is electrically coupled to fixed disk 402. Conducting strips 403 and 404 of rotating disk 401 are electrically coupled to similar conductors of fixed disk 402. Fixed disk 402 is mounted to frame 28 and is electrically coupled to device electronics 24. Therefore, electrical signals from detector 22 are transmitted to device electronics 24 through the electrical coupling of rotating disk 401 with fixed disk 402.

It is understood that the specific embodiments shown and described in FIGS. 1 through 4b are capable of variation and modification without departure from the true spirit and scope of the present invention. As an example, one variation might be to position motor drives M1 and M2 off axis from the central vertical axis of optical source 12. Motor drives M1 and M2 could be positioned outside the scan radius and thereby advantageously eliminate the potential for blind spots in the scan region. Suitable mechanical drive and linkage systems (e.g., pulley or belt drives, gear drives, etc.) may be used to transfer rotational movement from motors M1 and M2 to hub 20 and entrance aperture mirror 14, respectively.

In order to perform measurements of the near field radiation pattern of an optical source where the detector is in the far field, focusing optics, such as a lens (not shown), may be placed in the light path between optical source 12 and detector 22. For example, focusing optics may be placed at a midpoint of the light path in the mirror train embodiments described with FIGS. 3a and 3b. Alternatively, the mirror train embodiments of FIGS. 3a and 3b may employ mirrors with appropriately designed concave surfaces to perform the desired focusing function for near field measurements.

In accordance with another advantageous feature of the invention, active or movable mirrors may also be used to change the effective path length during scans to provide additional information on the radiation pattern of the source being measured. The active mirrors, for example, can employ solenoids, magnets, or other devices for moving mirrors in response to control signals from computer 104. In addition, the mirror positioning device can be controlled by computer 104 (FIG. 2b).

The measurement resolution at source 12 depends on the geometry and the particular arrangement used for light collection 16 (i.e., either optical fiber or reflector train). If optical fiber is used, the resolution is determined either by the fiber diameter or by any apertures placed in front of the fiber. If a reflector train is used, the measurement resolution is determined by an aperture stop in front of detector 22.

Figure 5:
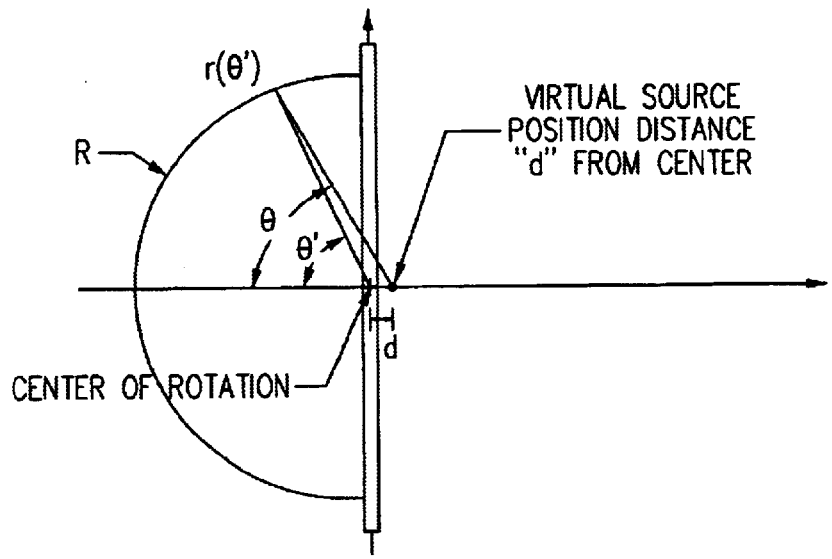
FIGS. 5 and 6 illustrate the scan eccentricity and angular transformation of the scan path relative to the optical source in embodiments of the present invention such as those illustrated in FIGS. 1, 2a, 3a, 3b and 4a having entrance apertures.
Figure 6:
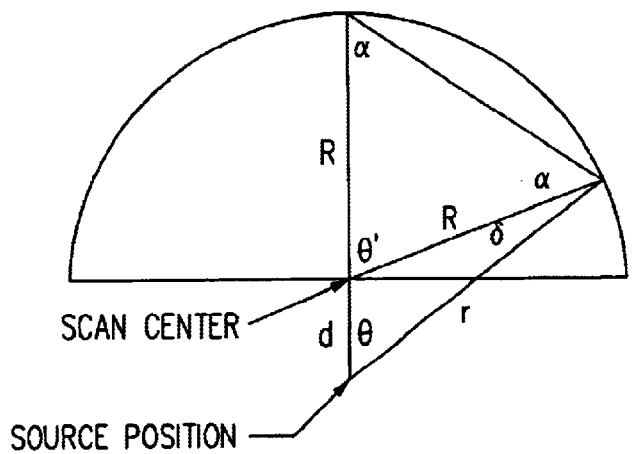

With reference to FIG. 5, it can be seen that the scan path is slightly eccentric because the virtual optical source, i.e., the optical source's apparent position in aperture mirror 14, is displaced slightly from the center of rotation of entrance aperture mirror 14, which is also the scan path center. If the displacement distance is "d", then the virtual source is displaced "d" from the center of the scan. Data is acquired from the sensor at radius R from the mirror, and over a range of angles $\theta'$, where $-90° \leq \theta' \leq +90°$. As is seen in FIGS. 5 and 6, the distance to the source, $r(\theta')$, is always greater than the scan radius, R, in view of offset, d. Also, the angle with respect to the source, $\theta$, is less than the angle with respect to the center of scan, $\theta'$, except at $\theta'=0°$, where they are equal. To obtain the radiation pattern of the source, it is therefore necessary to correct the amplitude of the data to correct for scan eccentricity, and also to transform the angle from the scan space to the space of the source.

The distance between the source and the detector as a function of angle, $r(\theta')$, is given by the expression:

$$r(\theta') = \sqrt{R^2 + d^2 + 2Rd\cos\theta'}.$$

The measured data will manifest this distance variation as an error. An isotropic radiation distribution, then, would show an angular dependence, which, instead of being constant, is proportional to the inverse square of $r(\theta')$. However, this error can be entirely compensated by applying a geometric correction factor based on $r^2(\theta')$.

The angular transformation is derived from the geometry shown in FIG. 6. The transformation is given by the expression $$\theta = \cos^{-1}\left[\frac{d + R\cos\theta'}{\sqrt{R^2 + d^2 + 2Rd\cos\theta'}}\right].$$

In general, the normal to the surface of the entrance to optical collector 16 does not point at source 12, but instead points at the scan center. This is evident from the discussion of the angular transformation above. A correction must be made to account for this change in orientation of optical collector 16 with respect to source 12 which occurs as the scan angle $\theta'$ changes. The change in angle is the difference between the scan angle $\theta'$ and source angle $\theta$. The correction factor, $F(\theta')$, is the reciprocal of the cosine of the angular difference:

$$F(\theta') = \frac{1}{\cos(\theta - \theta')}.$$

The s and p polarization components of the source will, in general, propagate differently through the optical system. These polarization effects are present due to (1) reflections from entrance aperture mirror 14, (2) reflections from reflector train components of collector 16, and (3) polarization dependent optical fiber transmission of collector 16. For mirrors and reflectors, the magnitude of the polarization effects is a function of the angle of incidence of the light on the reflecting surfaces, and the material properties of the reflecting surface. Polarization effects in the optical fiber depend on the fiber type.

Polarization effects will be greatest at entrance aperture mirror 14, where the angle of incidence of source light will range from essentially 0°–90°. The use of silver for the mirror surface material significantly reduces this effect.

Polarization effects due to reflector train components (See FIGS. 3 and 4) can be practically eliminated by coating the surfaces for equal reflection of the s and p components for a particular angle of incidence (e.g., 45°).

Polarization effects due to reflection and fiber transmission can be compensated by calibration. In addition, polarizing elements may be inserted between source 12 and entrance aperture mirror 14 in order to measure specific polarizations directly. In some embodiments, the polarizing elements may be controllable by computer 104.

In some embodiments, optical filters may also be included in the path between the entrance to collector 16 and detector 22. In some embodiments, the optical filters may be a filter wheel so that one of a set of optical filters may be inserted in the optical path. FIG. 3a, for example, shows an optical element 302 which can be any combination of optical filters, optical filter wheels, or polarizing elements. Optical element 302 may be computer controlled by computer 104 so that particular filters and polarizations are selected for individual scans of data.

Figure 7A:
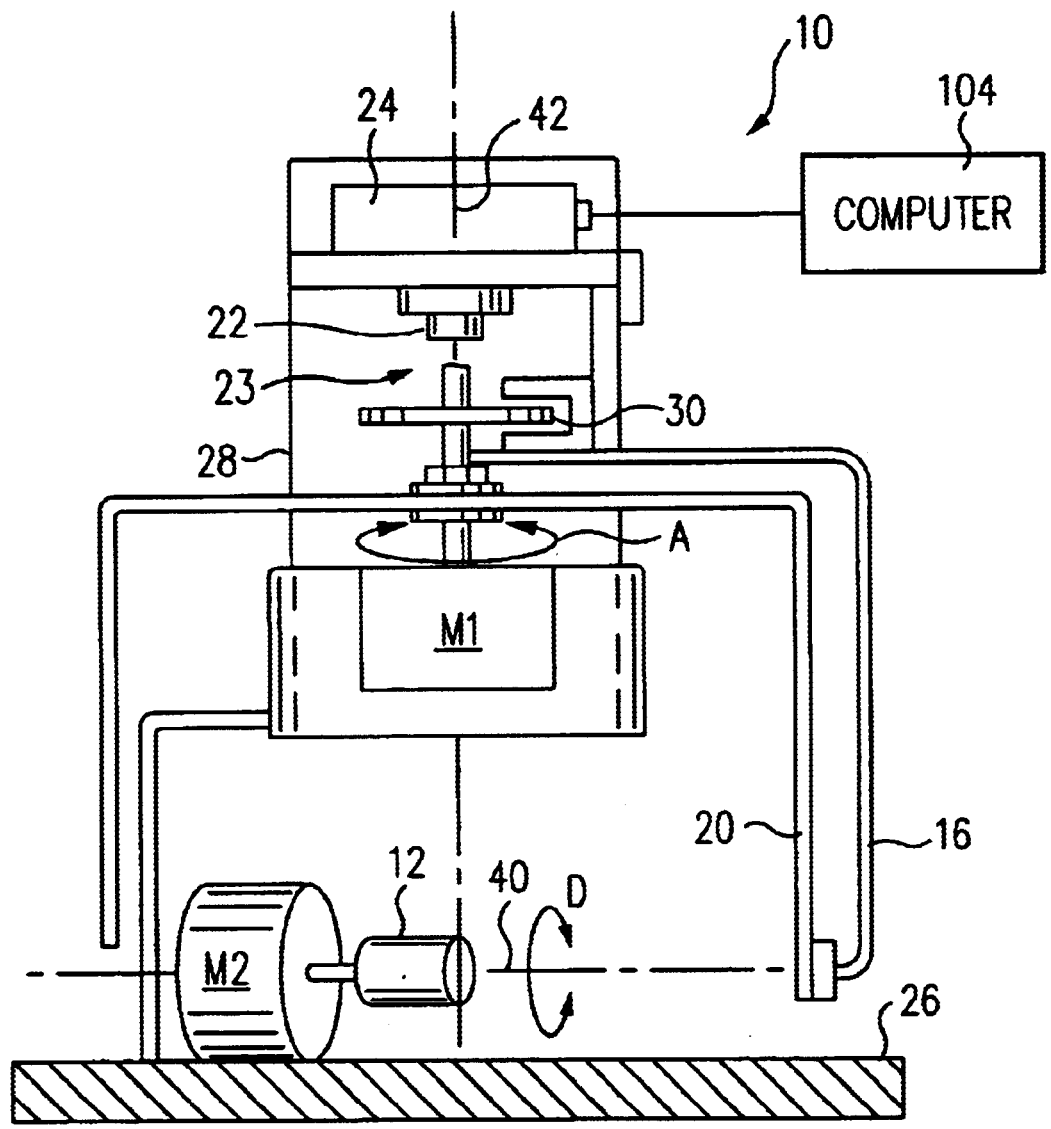
FIG. 7a shows a cross sectional view of another embodiment of a goniometric scanning radiometer in accordance with the present invention.

FIG. 7a shows an embodiment of the scanning radiometer 10 of the present invention that is similar to the embodiment shown in FIGS. 1 and 2, except that this embodiment does not include aperture mirror 14. In this embodiment, the central axis 40 of the light source 12 is transversely oriented or orthogonal to the axis of rotation of rotating hub 20. In operation, motor M2 rotates optical source 12 in incremental steps about axis 40 (as indicated by directional arrow D) as the input end of collector 16 (being rotated about central vertical axis 42) repeatedly scans through the light beam emanating directly from optical source 12. The direction D, around which source 12 is rotated, is in the plane described by the circular motion of the entrance to collector 16 as it is rotated around source 12.

Figure 7B:
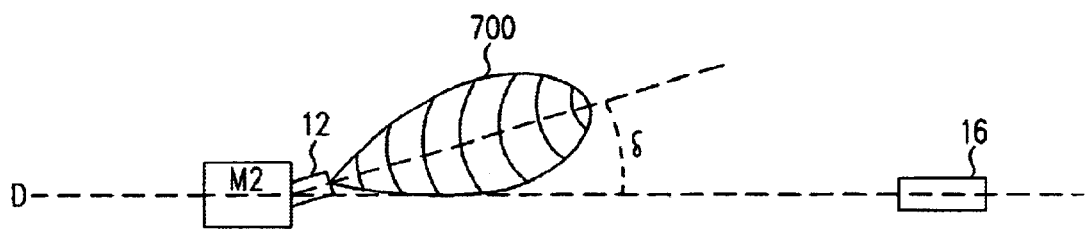
Figure 7C:
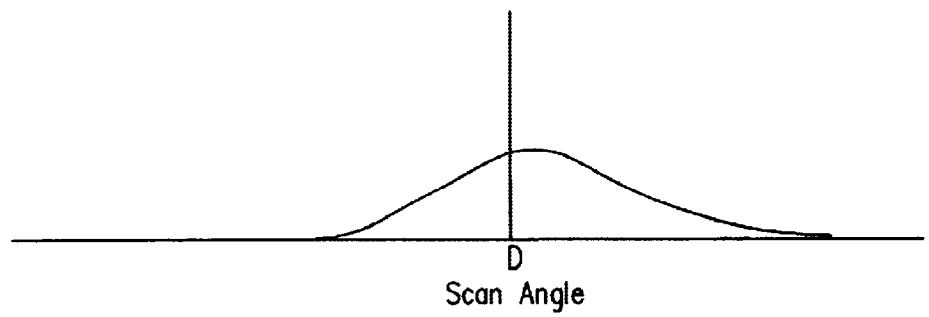

By rotating source 12 around D and taking scan data at a number of angular positions of motor M2, a three-dimensional mapping of the radiation profile can be obtained. FIG. 7b illustrates a configuration where source 12 is positioned in motor M2 such that the optical axis of source 12 makes an angle δ with axis 40. The radiation profile 700 from source 12, then, peaks along the direction of the optical axis of source 12. As shown in FIG. 7c, a scan of data through the range of collector 16 measures the portion of radiation profile 700 that intersects the plane described by the rotational motion of the entrance to collector 16.

Figure 7D:
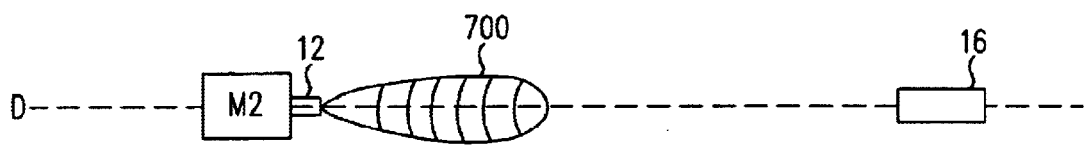
Figure 7E:
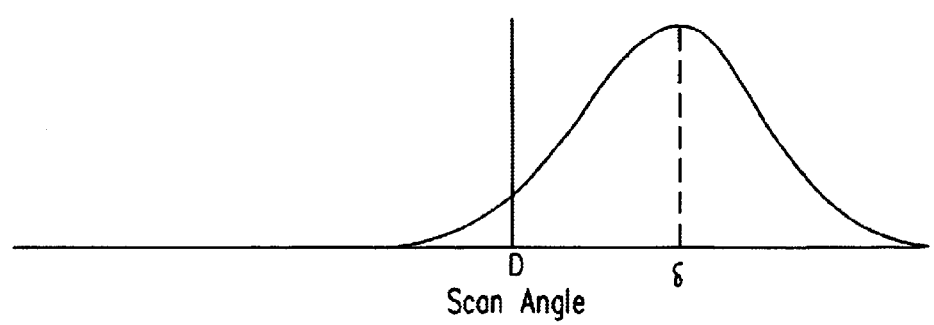

FIG. 7d shows radiation profile 700 at an angular position of motor M2 such that the peak of radiation profile 700 lies in the plane defined by the rotation of the entrance to collector 16. FIG. 7e shows the results of a scan through radiation profile 700 at that angular position of motor M2. Again, the scan is the intersection of radiation profile 700 with the plane defined by the rotation of the entrance to collector 16.

One advantage of the embodiment shown in FIG. 7a is that the source can be located at the center of the circle described by the motion of the entrance to collector 16 so that the data corrections described above due to the virtual source in aperture mirror 14 not being in the center of a circle described by the motion of collector 16 are not performed.

In some embodiments of a scanning radiometer 10 as shown in FIG. 7a, the distance between the end of a fiber under test and the entrance of optical collector 16 is about 6.62 cm. The entrance of optical collector 16 includes a 500 μM diameter pinhole to yield a 0.43° detector field-of-view at source 12. The data can be acquired with an angular sampling resolution of about 0.055°. In some embodiments, the scan rate can be about 10 Hz. Single far-field scans can then be obtained in about 50 ms, with updates obtainable about every 100 ms. Scanning and scan parameters are accomplished under the direction of computer 104. Since the entrance to collector 16 is rotating at a constant angular velocity around source 12, a scan of data can have any angular range about source 12.

Figure 8A:
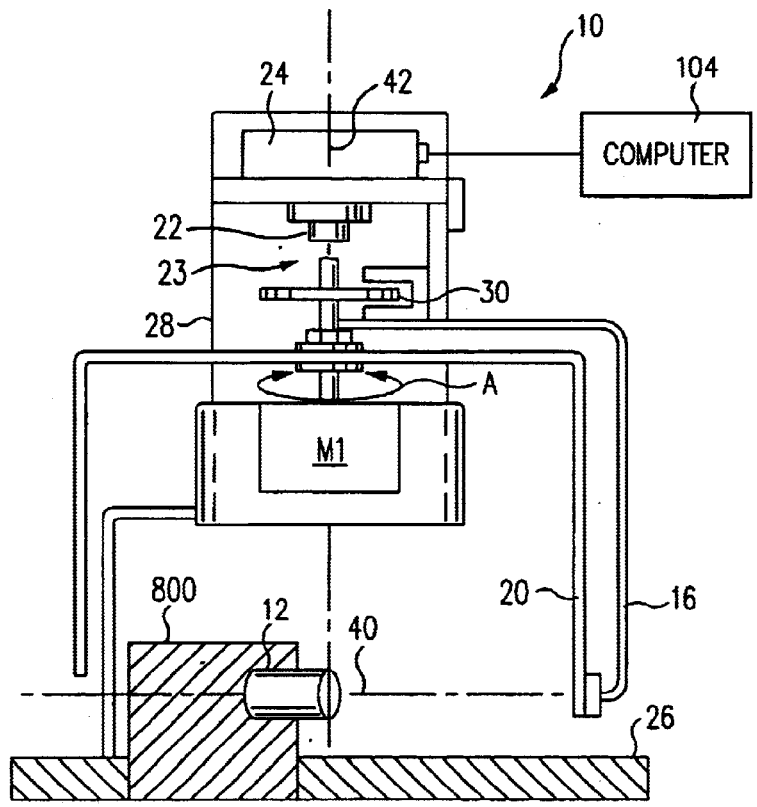
FIGS. 8a and 8b show an embodiment of a goniometric scanning radiometer in accordance with the present invention having a non-rotating source fixture
Figure 8B:
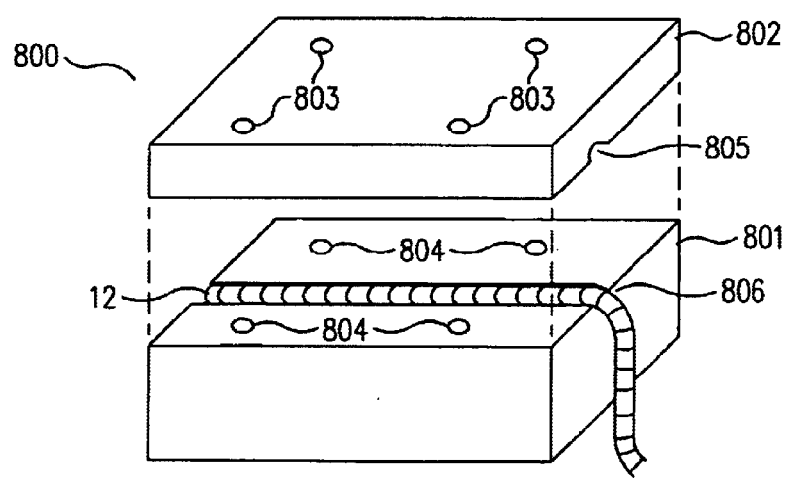

FIGS. 8a and 8b show an embodiment of scanning radiometer 10 which does not include motor M2. Instead, source 12 is fixed in holder 800 such that the optical axis of source 12 is substantially along axis 40 when holder 800 is inserted through platform 26. FIG. 8b shows an embodiment of holder 800 appropriate for positioning an optical fiber source 12. Holder 800 includes a base portion 801 and a cover portion 802. Base portion 801 includes a V-groove 806 for positioning optical fiber source 12. Cover portion 802 also includes a V-groove 805 which aligns with V-groove 806. When cover portion 802 is positioned and attached to base portion 801, optical fiber source 12 is held firmly in place and aligned along V-groove 806. V-groove 806 may extend through the side portion of base 801 so that holder 800 can be positioned through base 26 of radiometer 10 (FIG. 8a). In some embodiments, cover portion 802 can include positioning magnets 803 and base 801 can include positioning magnets 804 of the opposite polarity so that cover 802 is magnetically attached to base 801.

Figure 9A:
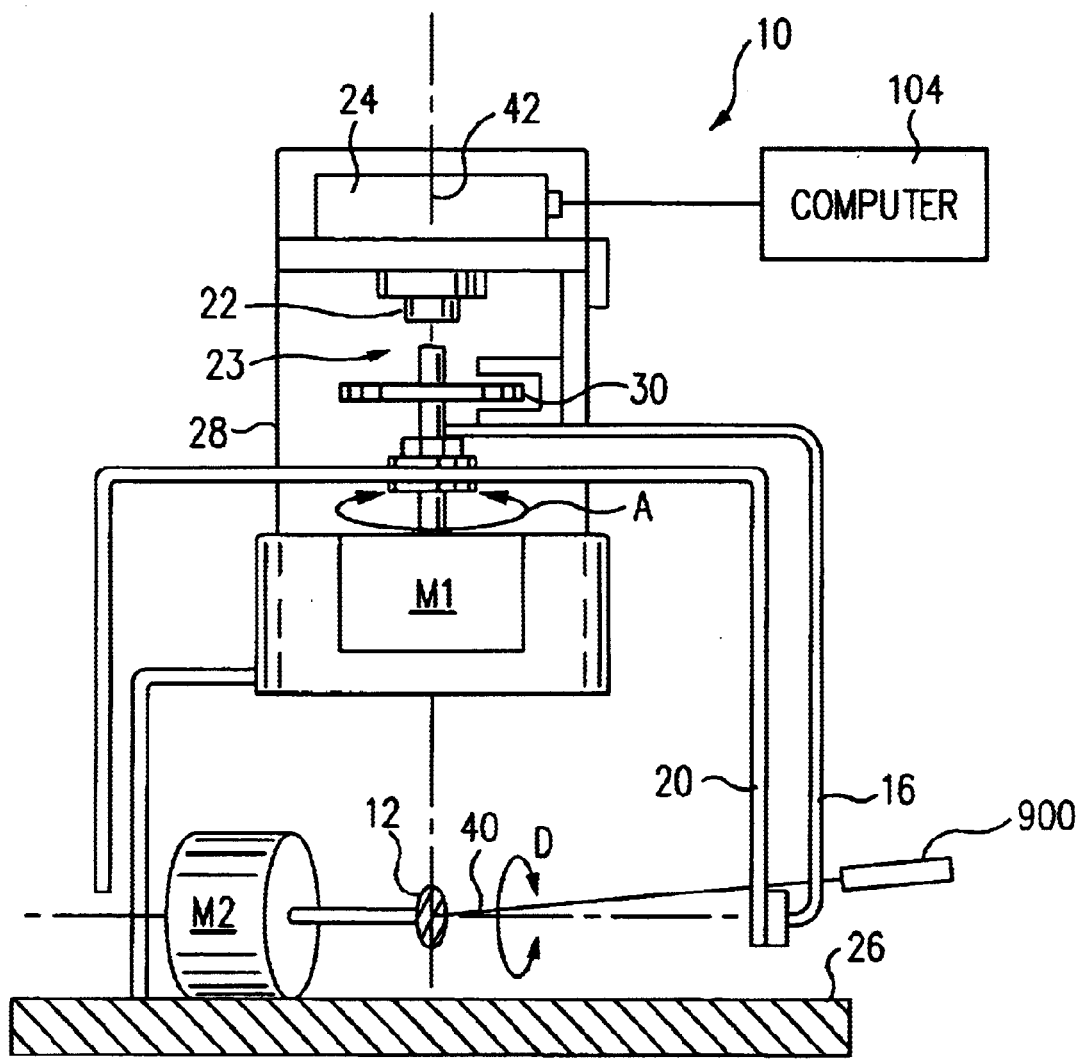
FIGS. 9a through 9e show embodiments of a scatterometer configuration of a goniometric scanning radiometer in accordance with the present invention.

FIG. 9a shows an embodiment of goniometric radiometer 10 operating as a scatterometer. Radiometer 10 of FIG. 9a collects data for a Bidirection Scatter Distribution Function (BSDF). Optical source 12 in radiometer 10 is a material under test which is irradiated by laser 900. In some embodiments, motor M2 is replaced by a fixed mount so that the material under test is not rotated around axis 40. For BSDF measurements, laser 900 is typically a collimated laser with a narrower radiation pattern than a single-mode optical fiber. As an example, laser 900 having less than about 1 mR divergence will support a measurement with dynamic range of approximately 40 dB greater than that obtained for a single-mode fiber operating at the same power level. Thus, the dynamic range for a BSDF measurement can easily exceed 120 dB.

Figure 9B:
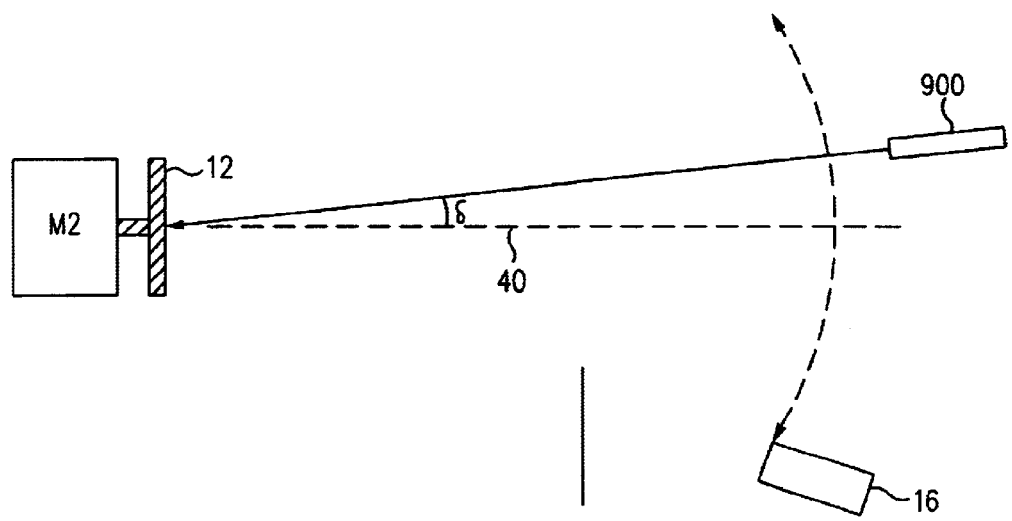
Figure 9C:
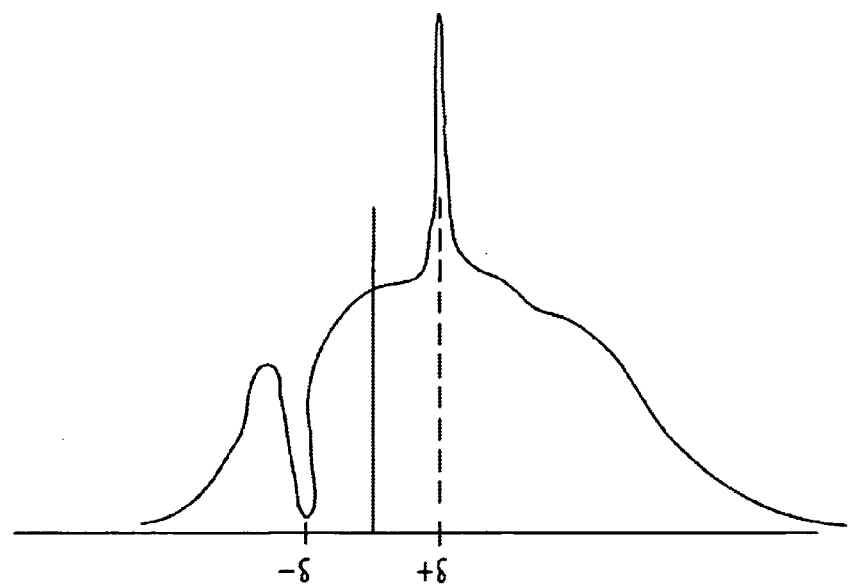

FIG. 9b shows an optical configuration of an embodiment of radiometer 10 of FIG. 9a. In FIG. 9b, laser 900 is positioned in the plane defined by the rotation of the entrance to collector 16. Laser 900 is positioned so that the light beam from laser 900 is incident on the material on axis 40 and makes an angle δ with axis 40. In some embodiments, the angle δ is arranged to be about 5°, although other incident angles can also be realized. FIG. 9c shows a sample scan of reflectance data from the material of source 12, a Bidirectional Reflectance Distribution Function (BRDF). Note that collector 16 blocks the laser beam from laser 900 at angle −δ and measures the reflected laser beam at angle +δ. In some embodiments, laser 900 may be positioned to irradiate the material under test from a position outside of the plane defined by the rotation of the entrance to collector 16.

Figure 9D:
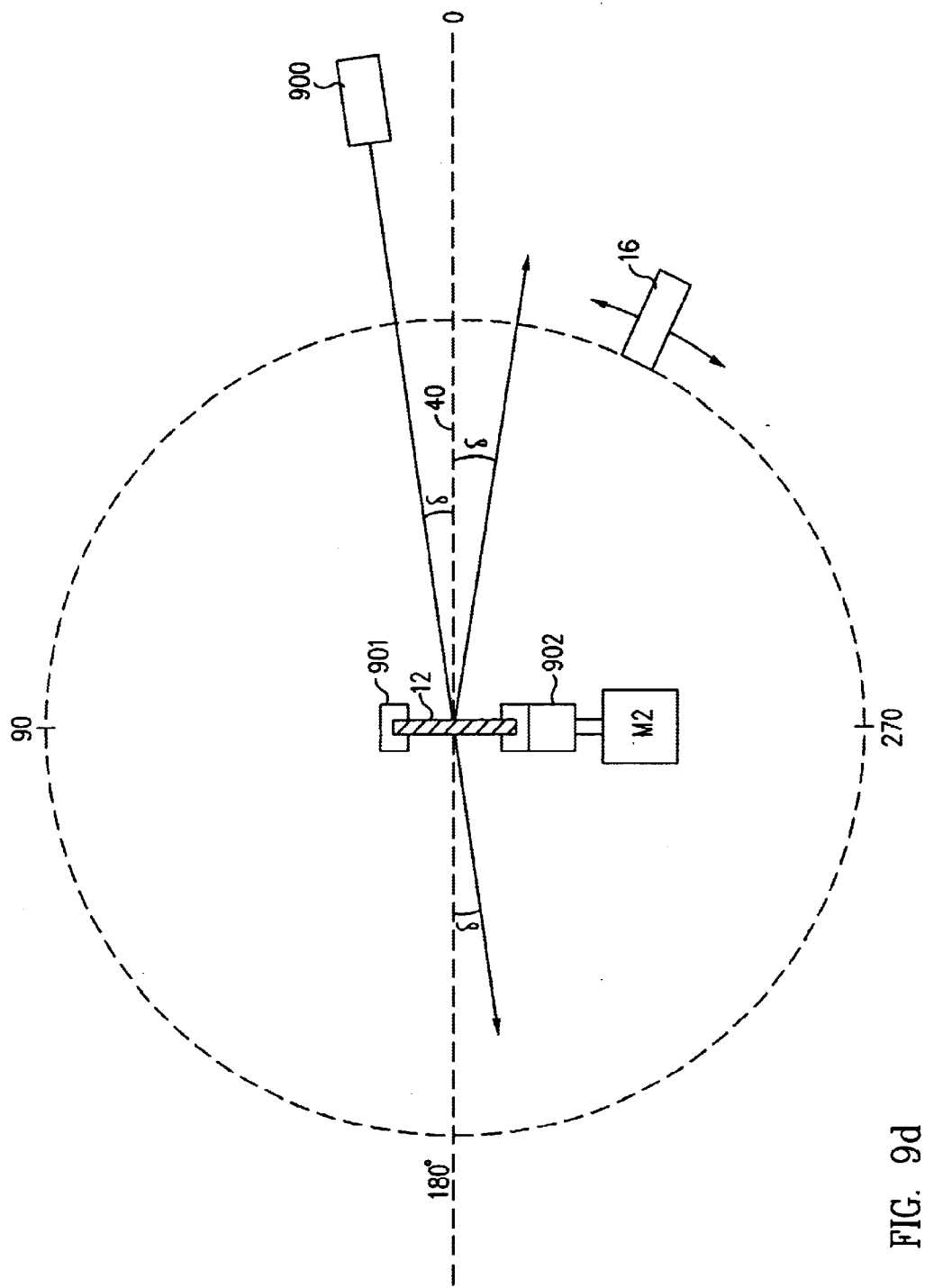

FIG. 9d shows an optical configuration of an embodiment of radiometer 10 of FIG. 9a operating to collect data for a Bidirectional Transmittance Distribution Function (BTDF) and a Bidirectional Reflectance Distribution Function (BRDF) in a single scan. Laser 900 is positioned to irradiate the material of source 12 at an incident angle of δ. Collector 16, which is rotated such that the entrance to collector 16 follows the circular path indicated by the dotted line, then measures the radiation profile transmitted through the material of source 12 in the angular region indicated in the counterclockwise rotation from 90 to 270° and measures the radiation profile reflected from the material of source 12 in the angular region indicated in the counterclockwise rotation from 270 to 90°. Collector 16 may be rotated in either a clockwise or counterclockwise fashion around the material of source 12. The material of source 12 is irradiated by laser 900 substantially at the intersection of axis 40 with the surface of the material so that the source of radiation is at the center of the circle traversed by the entrance to collector 16.

Figure 9E:
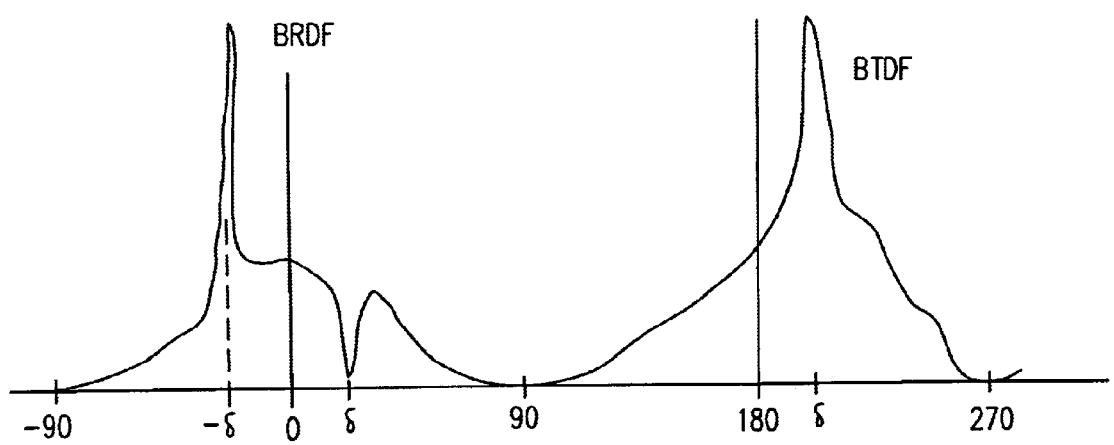

In FIG. 9d, source 12 is mounted in a fixture 901 and, in some embodiments, can be rotated around axis 40 by motor M2, which is mechanically coupled to transmission 902. Motor M2 is offset from axis 40 so as to allow access around the material of source 12. FIG. 9e shows a sample scan taken with the configuration of FIG. 9d which shows both a BRDF and a BTDF in a single 360° scan of collector 16 around the material of source 12. Although laser 900 may be positioned to irradiate the material of source 12 from any position, in some embodiments laser 900 is positioned in the plane defined by the rotation of the entrance to collector 16 and such that the incident angle is about 5°.

In accordance with the present invention, far-field data in each of these embodiments is obtained by acquiring multiple scans, which can be obtained at high speeds, at different incremental gain settings. The data from these multiple scans are then assembled to construct a compiled far-field radiation profile. This method of data acquisition and analysis enables computer 104 to obtain far-field radiation profiles with a dynamic range greater than what can be obtained from a single scan at one gain setting. The dynamic range, for example, can be comparable to that attained in much longer times utilizing a lock-in amplifier technique. For example, in some embodiments the single scan dynamic range is only 24 dB; but, using the gain ranging method allows compiled far-field radiation profiles to be obtained with a dynamic range of about 64 dB for a single-mode fiber source operating at a power level of 1 mW. For a 1 Watt fiber source, the obtainable dynamic range is about 94 dB. During data acquisition, to obtain adequate signal-to-noise (SNR) at each gain setting, an appropriate number of scans at that gain setting can be averaged to obtain an averaged scan. Data from the averaged scan at each gain setting is assembled into the compiled far-field profile. In some embodiments, the program executed by computer 104 can detect amplifier saturation and reject invalid data. In some embodiments, fiber parameters can be available in less than about 20 seconds.

In some embodiments of the invention, the three-dimensional far-field radiation profile is determined by combining compiled scans corresponding to different planar intersections with the radiation profile of source 12. The position of entrance aperture 14, or, as in FIG. 7a, the angular position of motor M2, determines the azimuthal angle from the optical axis of source 12. As illustrated in FIGS. 7b and 7d, the azimuthal angle is the angle between the optical axis of source 12, along which the radiation profile has a maximum intensity, and axis D which is in the plane defined by the entrance of collector 16. Each scan, then, generates a cross-sectional slice of the radiation profile of source 12 corresponding to the intersection of the plane defined by the entrance of collector 16 with the radiation profile at a particular azimuthal angle. Computer 104, then, given a series of cross-sectional compiled scans, can construct the three-dimensional radiation profile of source 12.

Figure 10:
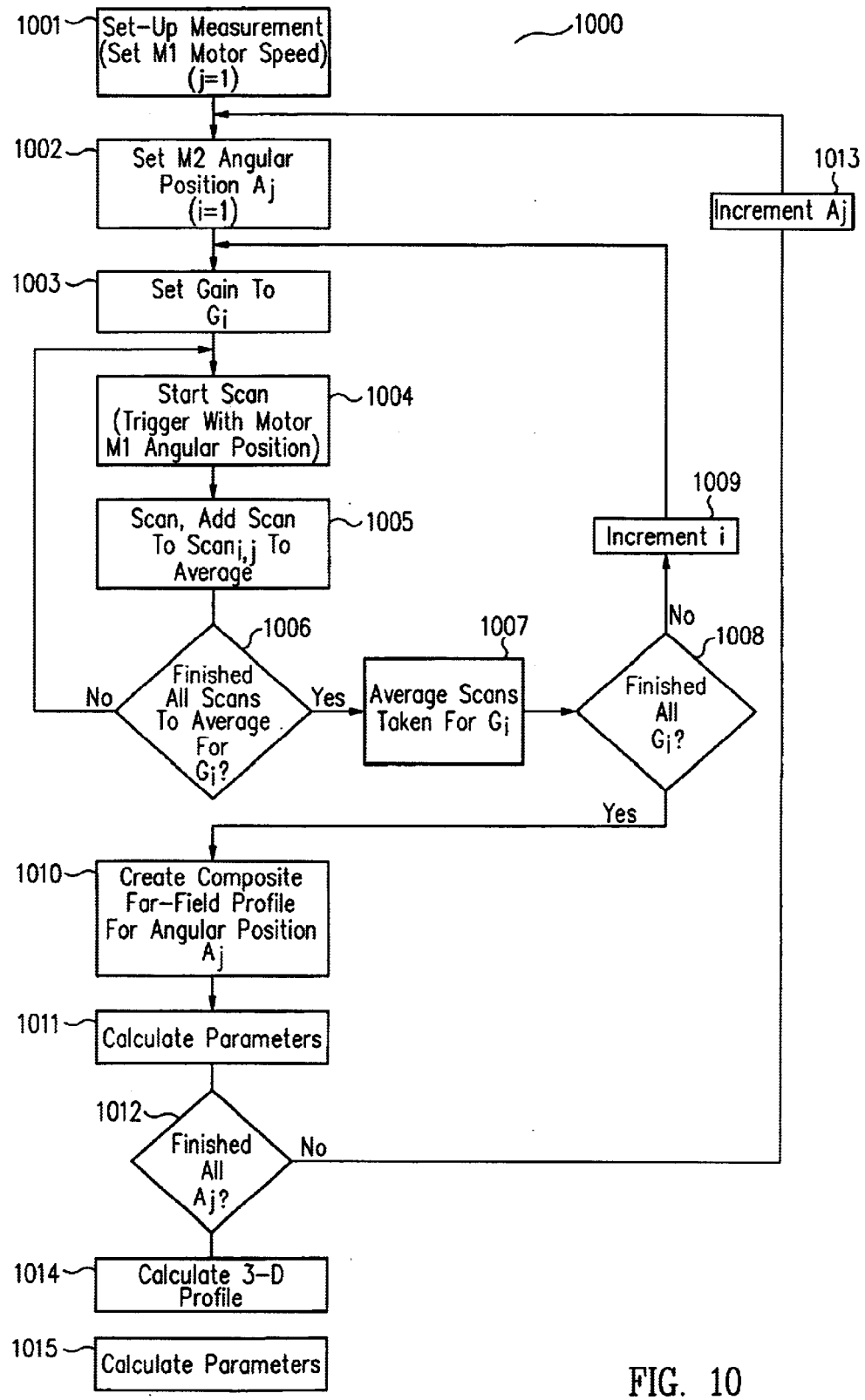
FIG. 10 shows a logic flow chart of a computer program for operating a goniometric scanning radiometer in accordance with the present invention.

FIG. 10 shows an embodiment of a flow diagram 1000 for a computer program that operates on computer 104 (FIG. 2b) controlling an embodiment of goniometric scanning radiometer 10 according to the present invention. In set-up measurement 1001, the computer clears memory space to hold scan data for each selected gain setting of receiver electronics 24 (FIG. 2b) and starts motor M1 so that hub 20 has a selected angular velocity. In some embodiments, a user may enter a series of individual gain settings along with the number of scans to be averaged at each gain setting. In block 1002, motor M2 is positioned to a preselected angular position $A_j$. The angular position $A_j$ of motor M2 corresponds to an azimuthal angle of the radiation profile from source 12 relative to the plane defined by the rotation of the entrance to collector 16. In some embodiments, for example the embodiments shown in FIG. 8a, motor M2 is replaced with a fixed holder 800 for source 12 so that flow chart 1000 appropriate for that embodiment does not include a step of setting the angular position of motor M2. In some embodiments, motor M2 is a stepper or servo motor angularly positioned in response to signals from computer 104, as shown in FIG. 2b.

In block 1003, computer 104 sets the gain of receiver electronics 24 (FIG. 2b) to be one of the selected gains, gain $G_i$. The selected gains, $\{G_i\}$, are chosen to obtain the desired dynamic range for the measured compiled radiation profile. On the first iteration, the first gain, gain $G_1$, is set. In block 1004, motor M1 is positioned so that the entrance to collector 16 is at a starting angle for the scan. Alternatively, if motor M1 is continuously rotating, rather than being a stepper or servo motor, then computer 104 triggers the beginning of a scan when motor M1 positions the entrance of collector 16 at a pre-selected starting angle for a scan. In block 1005, a scan of the far-field radiation profile at gain $G_i$ is obtained. The scan is added into memory at $scan_{ij}$ corresponding to the scan at gain $G_i$ with motor M2 angular position at $A_j$. The number of data points measured in each individual scan depends on the angular resolution determined by the entrance to collector 16, which in some cases can be less than about 0.055°, and the desired resolution of the scan, which can be input at step 1001. In block 1006, the computer determines how many more scans at gain $G_i$ need to be averaged. If all individual scans at gain $G_i$ have been acquired, then the data in $scan_{ij}$ is divided by the number of scans taken at gain $G_i$ in block 1007. If there are further scans to be taken, the computer returns to block 1004 to start another scan at gain $G_i$. Block 1007, then, finishes the averaging of scans at gain $G_i$.

In block 1008, computer 104 determines whether all scans for all gain settings in the set of gain settings (i.e., all $G_i$) for a particular position of angular position of motor M2, $A_j$, have been taken. If not, the next gain setting is chosen in block 1009 and the system returns to block 1003 to acquire another averaged scan by averaging a predetermined number of scans at gain $G_j$.

Figure 11A:
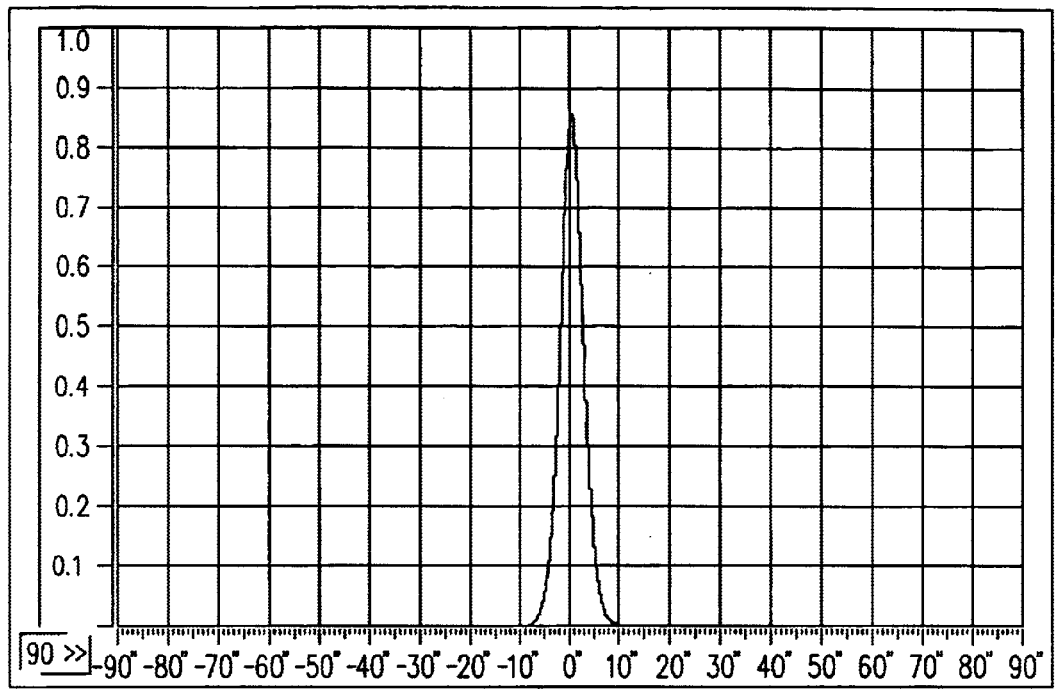
FIG. 11a shows a far-field profile obtained by averaging data from one (1) scan at amplifier gain setting 51.
Figure 11B:
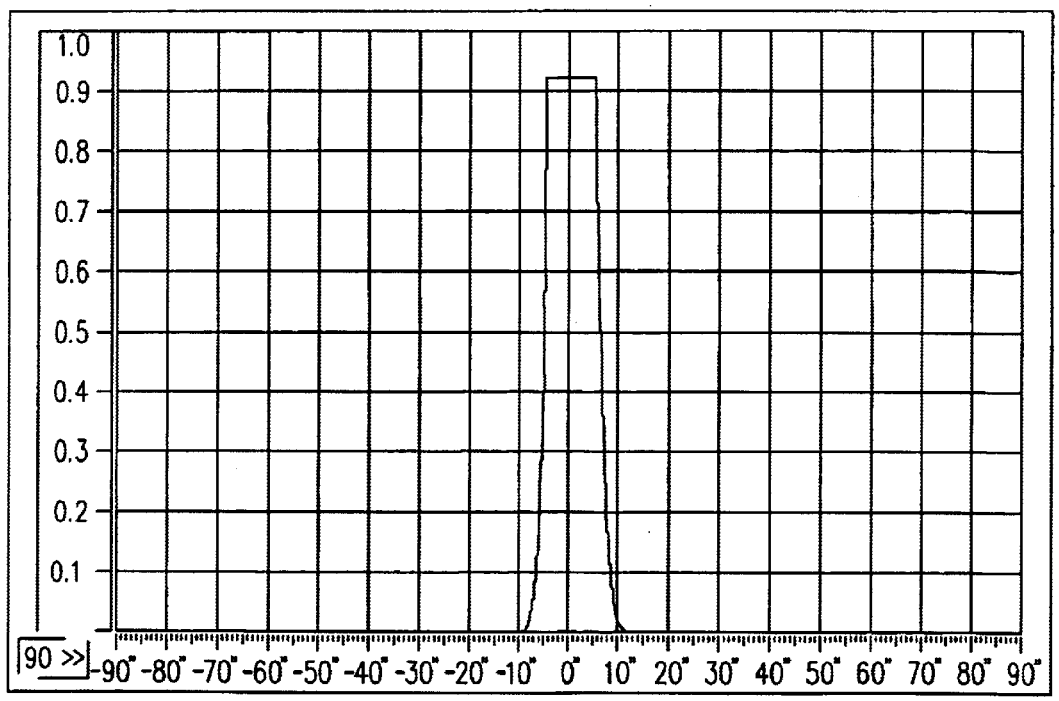
FIG. 11b shows a far-field profile obtained by averaging data from one (1) scan at amplifier gain setting 71.
Figure 11C:
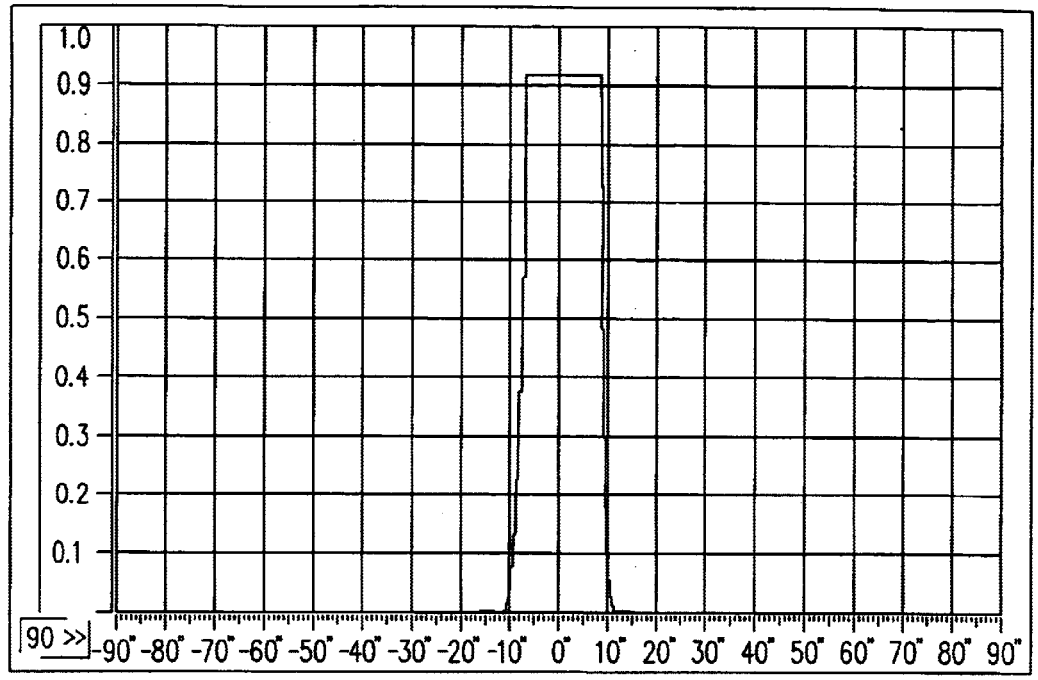
FIG. 11c shows a far-field profile obtained by averaging data from ten (10) scans at amplifier gain setting 91.
Figure 11D:
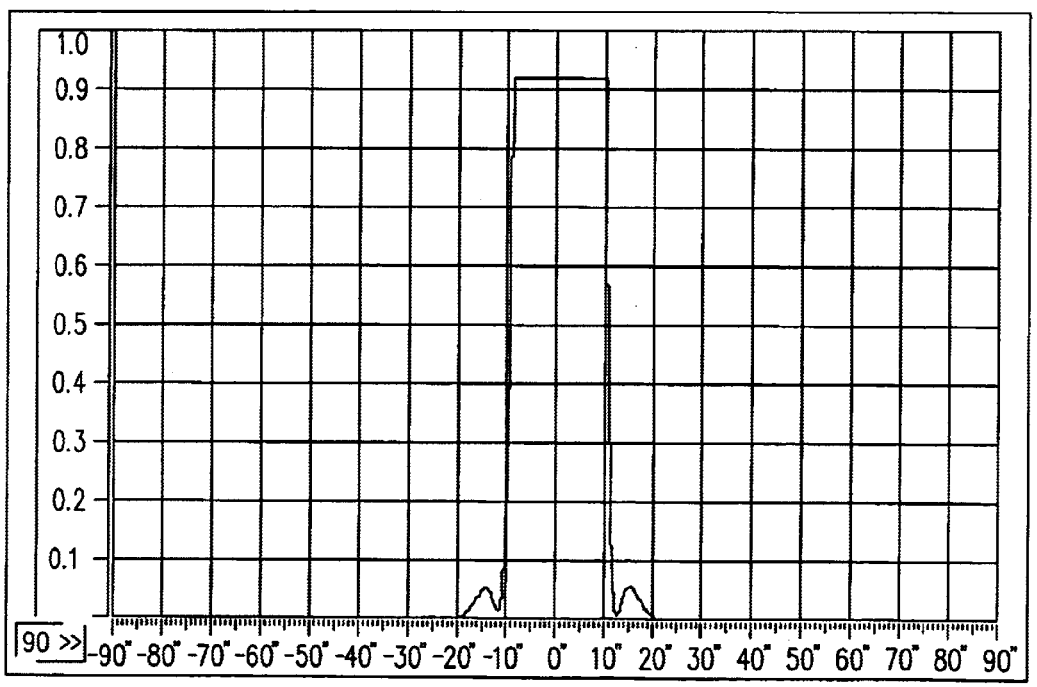
FIG. 11d shows a far-field profile obtained by averaging data from thirty (30) scans at amplifier gain setting 111.
Figure 11E:
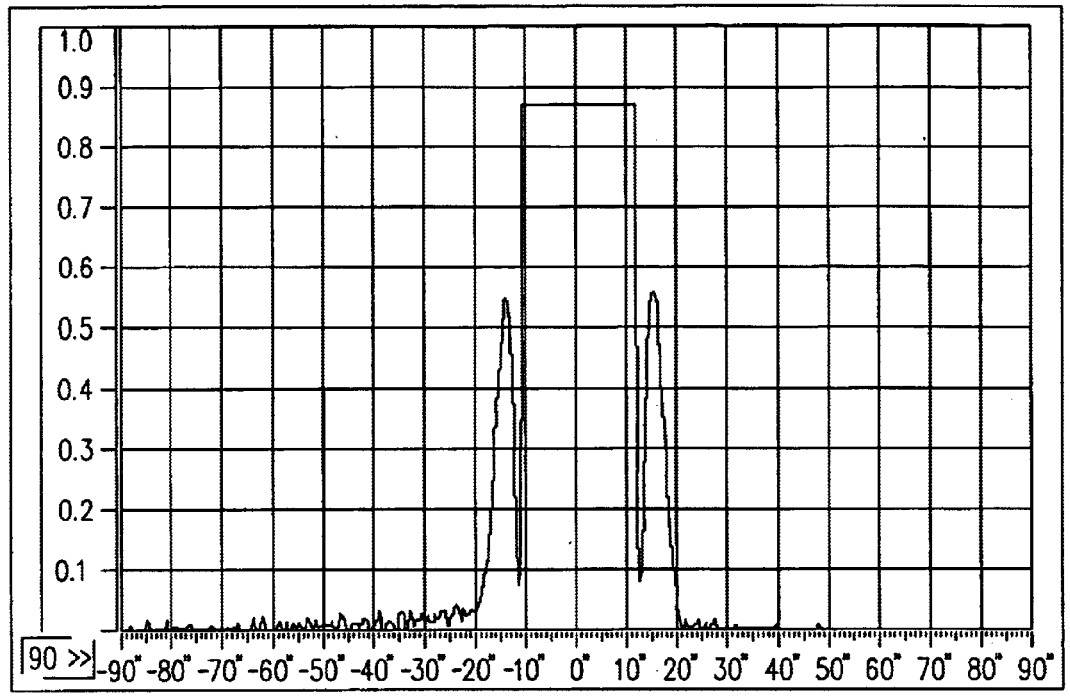
FIG. 11e shows a far-field profile obtained by averaging data from one hundred (100) scans at amplifier gain setting 131.

Examples of data obtained during individual averaged scans of a signal-mode optical fiber coupled to a Fabry-Perot laser diode source operating at a nominal wavelength of 1300 nm and output power of 2 mW is shown in FIG. 11a through 11e. Electronics 24, which includes amplifier 102 (FIG. 2b), in this example, is capable of a programmable gain from 0 to 194 dB. FIG. 11a shows a far-field scan obtained by averaging one (1) scan at a gain setting G of 51 dB. FIG. 11b shows a far-field scan obtained by averaging data from one (1) scan at a gain setting G of 71 dB. FIG. 11c shows a far-field scan obtained by averaging data from ten (10) scans at a gain setting G of 91 dB. FIG. 11d shows a far-field scan obtained by averaging data from thirty (30) scans at a gain setting G of 111 dB. FIG. 11e shows a far-field scan obtained by averaging data from one hundred (100) scans at a gain setting G of 131 dB.

Figure 11F:
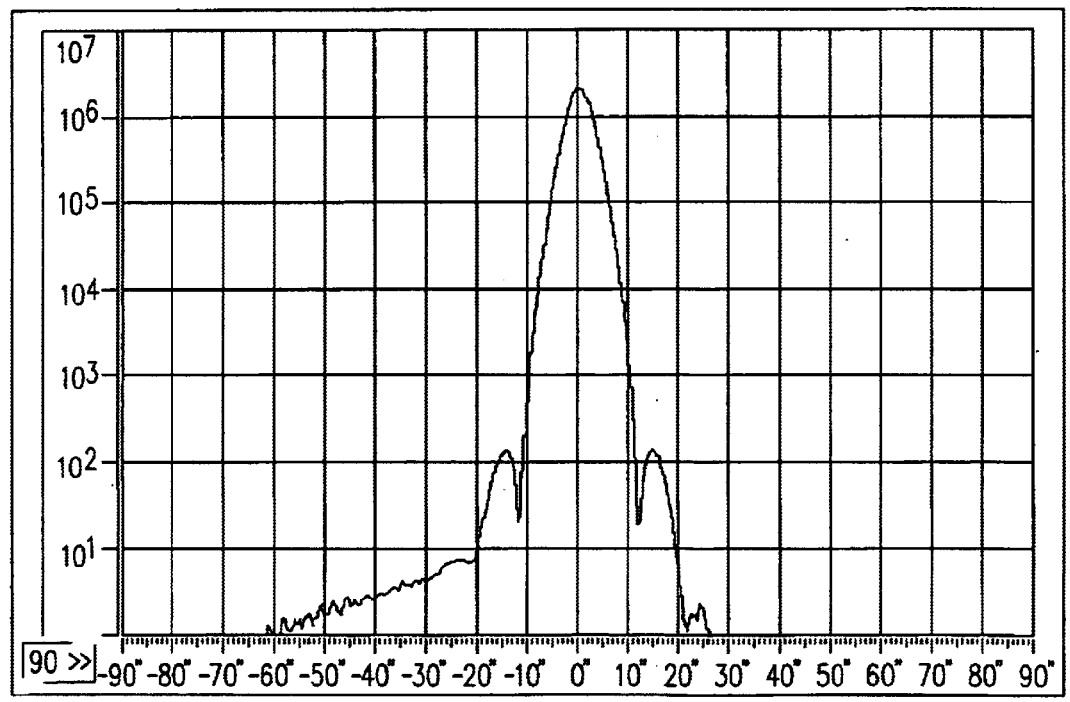
FIG. 11f shows a composite far-field profile obtained by reassembling data from the scans shown in FIGS. 11a through 11e.

In block 1010 of FIG. 10, a composite far-field profile is constructed. FIG. 11f shows an example of a composite far-field profile obtained by assembling data from the scans of FIGS. 11a–11e. The scale in FIG. 11f is logarithmic in order to show the entire dynamic range. The composite far-field profile is constructed from the far-field scans of each of the gain settings $G_i$, e.g., the scans shown in FIGS. 11a through 11e. The data from the scan at the lowest gain setting with values above a threshold level are utilized as the central portion, determining the composite far-field profile between angles $\theta_{1-}$ and $\theta_{1+}$. The data from the next highest gain scan which is higher than the threshold level is utilized to supply data from angle $\theta_{2-}$ to $\theta_{1-}$ and between $\theta_{1+}$ to $\theta_{2+}$.

This process is repeated until the composite far-field scan is completed. In some embodiments, data is normalized for gain. In some embodiments, the composite far-field scan may undergo data smoothing in order to remove any discrepancies between scans.

Figure 12:
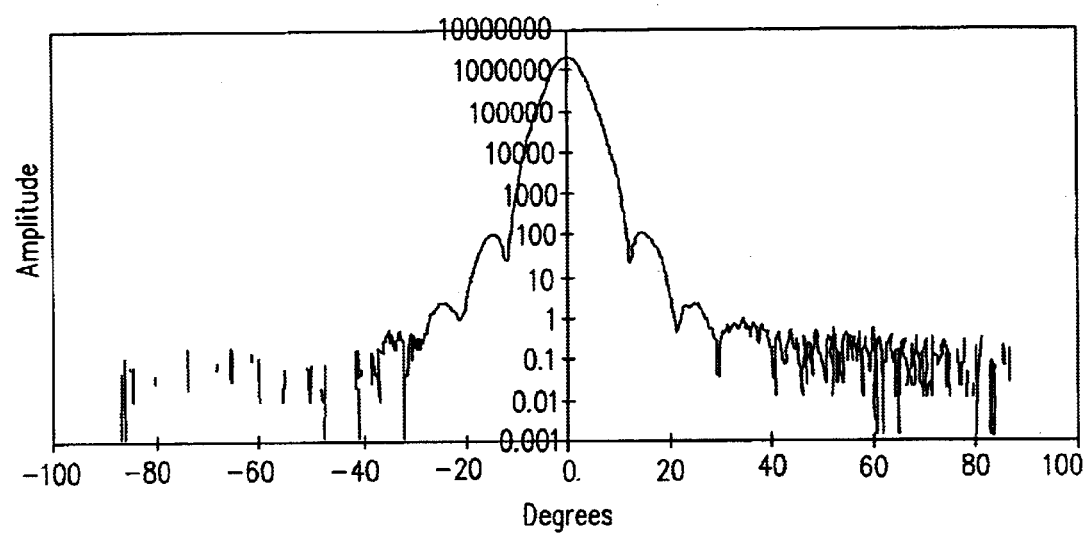
FIG. 12 shows another composite far-field profile of a single-mode optical fiber obtained with an embodiment of a goniometric scanning radiometer in accordance with the present invention.

FIG. 12 shows another example of a composite far-field profile obtained for a single-mode fiber obtained with an embodiment of the present invention. The composite far-field profile shown in FIG. 12 is a complete scan range from θ=−90° to θ=+90° with single amplitude ranging over 9 decades. Two sets of cusps are clearly defined, and two more cusps can be seen where the signal approaches the background noise level at the 0.1 amplitude level.

In some embodiments where source 12 is a fiber, the composite far-field profile is utilized to calculate parameters of the fiber under test in block 1011. In some embodiments, the calculated fiber parameters can be available to the user in about 20 seconds. From the composite far-field profile such as those shown in FIGS. 11f and 12, computer 104 can calculate fiber parameters. The Mode-Field Diameter (MFD) is calculated from the composite far-field profile using the Petermann II integral in accordance with the TIA/EIA Standard DFF Method given in FOTP-191. The TIA/EIA Standard DFF method of FOTP-191 is described in "Measurement of Mode-Field Diameter of Single-Mode Optical Fiber", Fiberoptic Test Procedure FOTP-191, Telecommunications Industry Association, Standards and Technology Department, 2500 Wilson Blvd., Suite 300, Arlington, Va. 2201 (1998), herein incorporated by reference in its entirety.

The Effective Area ($A_{eff}$) is calculated from the composite far-field profile according to the TIA/EIA Standard DFF Method described in FOTP-132, using a threshold algorithm to eliminate noise from the computation and to more accurately determine the locations of the cusps, which is necessary for sign reversal of the data The TIA/EIA Standard DFF method of FOTP-132 is disclosed in the publication entitled "Measurement of the Effective Area of Single-Mode Optical Fiber", Fiberoptic Test Procedure FOTP-132, Telecommunications Industry Association, Standards and Technology Department 2500 Wilson Blvd., Suite 300, Arlington, Va., 22201 (1998), herein incorporated by reference in its entirety.

The Numeral Aperture (NA) can be calculated from the composite far-field profile in accordance with the TIA/EIA Standard using the far-field method described in the publication entitled "Numerical Aperture Measurement of Graded-Index Optical Fibers", Fiberoptic Test Procedure FOTP-177, Telecommunications Industry Association, 2001 Pennsylvania Ave. N.W., Washington, D.C. 20006 (1992), herein incorporated by reference in its entirety. Specifically, the Numerical Aperture is obtained from the inverse sine of the 5% intensity half angle of the composite far-field radiation profile and can be determined in a single scan.

In some embodiments, block 1012 determines if a composite far-field radiation profile has been obtained for each of a selected number of angular positions $A_j$ of motor M2. If all of the data has not been taken, then the next angular position is selected in block 1013 and the program returns to block 1002 in order to set motor M2 to the next angular position. If a composite far-field radiation profile has been obtained for each of the selected number of angular positions $A_j$, then a 3-D radiation profile is constructed in block 1014. From the composite far-field radiation profiles, which represent slices through particular planes of the 3-D radiation profile, computer 104 can determined the optical axis of source 12 and construct the 3-D profile. In embodiments of radiometer 10 such as that shown in FIGS. 8a and 8b, only a single plane of far-field radiation profile can be obtained.

If a 3-D radiation profile has been calculated in block 1014, then the parameters described above (e.g., the Mode-Field Diameter (MFD), the Effective Area ($A_{eff}$), and the Numeral Aperture (NA) can be calculated from the 3-D radiation profile as described above. This calculation is accomplished in block 1015. In scatterometer embodiments, the parameter calculations in blocks 1011 and 1015 are replaced with calculations based on BSDF data.

An example of a computer program for performing blocks 1010 and 1011 of FIG. 10 is shown in Microfiche Appendix A, which is filed with this application and herein incorporated by reference in its entirety.

Measurements were performed to assess the "push-button" repeatability of an embodiment of goniometric radiometer 10. Table 1 summarizes the results for three different series of measurements of MFD and Table 2 summarizes the corresponding results for $A_{eff}$. The results for series "A", with 250 measurements of the composite far-field radiation profile, had a 3σ repeatability of 0.004 μm for MFD and 0.463 μm² for $A_{eff}$. Similarly, the series "B" measurements, again with 250 measurements of the composite far-field radiation profile, had a 3σ repeatability of 0.0054 μm for MFD and 0.463 μm² for $A_{eff}$. Again, the series "C" measurements, with 1000 measurements of the composite far-field radiation profile, had a 3σ repeatability of 0.0095 μm for MFD and 0.512 μm² for $A_{eff}$.

TABLE 1

Mode-Field Diameter "Push-Button" Repeatability Tests for 3 series of measurements

|  | Min (μm) | Max (μm) | Mean (μm) | 3σ (μm) |
| --- | --- | --- | --- | --- |
| A(250) | 9.3886 | 9.3954 | 9.3920 | 0.0040 |
| B(250) | 9.3860 | 9.3953 | 9.3901 | 0.0054 |
| C(1000) | 9.4367 | 9.4588 | 9.4463 | 0.0095 |

TABLE 2

Effective Area "Push-Button" Repeatability for the three series of measurements of Table 1.

| Series | Min (μm²) | Max (μm²) | Mean (μm²) | 3σ (μm²) |
| --- | --- | --- | --- | --- |
| A(250) | 69.603 | 70.099 | 69.770 | 0.463 |
| B(250) | 69.444 | 70.035 | 69.727 | 0.4846 |
| C(1000) | 69.736 | 71.384 | 71.013 | 0.512 |

From Tables 1 and 2, the 3σ push-button repeatability is better than 0.1 μm for the Mode-Field Diameter and approximately 0.5 μm² for the Effective Area. These values are of the same order of uncertainty due alone to problems associated with the computation algorithms for calculating MFD and $A_{eff}$. Some of the variation in parameter values is also attributed to fluctuations in the amplitude and wavelength of the light emitted by source 12 during measurement, as evidenced by the broader range of MFD and $A_{eff}$ values for the longer "C"-series measurements. Finally, based on numerous series of measurements, the overall accuracy of embodiments of the present invention can be conservatively specified at about ±0.5% for MFD and approximately ±1% for $A_{eff}$.

Angular width measurements in some embodiments of the invention can be obtained with a standard deviation of approximately 0.1°, which gives a 3σ variation of approximately ±0.0025 for the Numeral Aperture calculation for typical graded-index optical fibers, which is better than ±1% accuracy.

Therefore, in some embodiments of the invention the Mode-Field Diameter and Effective Area of single-mode fibers can be obtained in less than about 20 seconds with greater than 64 dB dynamic range. The Numerical Aperture of multi-mode fibers can be obtained in real-time with a single scan. Some embodiments of the invention have an overall accuracy of about ±0.5% for MFD and approximately ±1% for $A_{\mathit{eff}}$. The accuracy for measurements of NA is also about ±1%. The speed of measurement in these embodiments allows testing of greater numbers of fibers economically. The speed also provides the ability to acquire statistical data and potentially eliminates variation in measured parameters due to source fluctuations. Finally, the compact size of some embodiments of the invention allows for portable field use.

The specific embodiments of the invention disclosed above are exemplary only. One skilled in the art may recognize certain variations that are intended to be within the scope of the invention. For example, three-dimensional radiation profiles can be measured by setting the gain $G_i$ and then taking averaged scans for each of the set of selected angular positions for motor M2, instead of the method specifically described with FIG. 10. Therefore, the invention is limited only by the following claims.

What is claimed is:

1. A goniometric far-field radiation profile scanning apparatus, comprising:
    a collector coupled to receive light from a source, the collector being mounted on a housing that is rotatable about a central axis;
    an optical detector coupled to receive light from the collector;
    a detector electronics having a programmable gain, wherein the detector electronics is coupled to receive an output signal from the detector, and
    a data-acquisition computer coupled to receive a data signal from the detector electronics, the data-acquisition computer capable of taking a series of scans at different values for the programmable gain in order to generate a composite scan, each scan corresponding to receiving the data signal at a series of angular positions of the housing about the central axis.

2. The apparatus of claim 1, further including an aperture mirror capable of reflecting light from the source toward the collector, the aperture mirror being rotatable about the optical axis of the source, the optical axis of the source being the central axis.

3. The apparatus of claim 1, wherein the source is rotatable in a plane defined by the rotation of an entrance to the collector.

4. The apparatus of claim 1, further including a fixed holder for holding the source.

5. The apparatus of claim 1, wherein the source is an optical fiber.

6. The apparatus of claim 1, wherein the source is a material under test irradiated by a laser.

7. The apparatus of claim 1, wherein the source is a LED.

8. The apparatus of claim 1, wherein the source is a laser.

9. The apparatus of claim 1, further including a cover.

10. The apparatus of claim 9, wherein the cover includes an optical get-lost path.

11. The apparatus of claim 9, wherein stray light from the source is absorbed in absorbers positioned inside the cover.

12. The apparatus of claim 1, wherein the collector includes an optical fiber.

13. The apparatus of claim 1, wherein the collector includes an optical fiber bundle.

14. The apparatus of claim 1, wherein the collector includes a mirror train.

15. The apparatus of claim 1, wherein the detector is part of the collector and is mounted on the housing.

16. The apparatus of claim 1, wherein the detector is stationary and aligned with an exit from the collector.

17. The apparatus of claim 1, further including an optical filter coupled between the optical detector and the collector.

18. The apparatus of claim 1, further including a polarization element coupled between the optical detector and the collector.

19. The apparatus of claim 1, wherein the data-acquisition computer generates a gain signal to control the gain of the device electronics.

20. The apparatus of claim 2, wherein the data-acquisition computer is capable of controlling the position of the aperture mirror.

21. The apparatus of claim 1, wherein the data-acquisition computer is capable of controlling the angular velocity of the housing.

22. A method of acquiring a far-field radiation profile of a source, comprising:
    placing the source in a goniometric far-field scanning apparatus;
    acquiring a set of far-field scans, each scan in the set of far-field scans corresponding to a gain setting of a device electronics coupled to receive a signal from an optical detector of the goniometric far-field scanning apparatus;
    constructing a compiled far-field radiation profile from the set of far-field scans.

23. The method of claim 22, wherein acquiring a scan in the set of far-field scans comprises:
    setting the gain of the device electronics to a gain value corresponding to the scan;
    rotating a collector to collect light to capture light from the source in a plane defined by the rotation of an entrance to the collector;
    detecting the light collected by the collector with the optical detector;
    storing data acquired from a data signal from the device electronics.

24. The method of claim 23, further including averaging a preselected number of scans at the gain value corresponding to the scan.

25. A method of acquiring a far-field radiation profile of a source, comprising:
    placing the source in a goniometric far-field scanning apparatus,
    acquiring a set of far-field scans, each scan in the set of far-field scans corresponding to a gain setting of a device electronics coupled to receive a signal from an optical detector of the goniometric far-field scanning apparatus;
    constructing a compiled far-field radiation profile from the set of far-field scans;
    wherein acquiring a scan in the set of far-field scans comprises:
        setting the gain of the device electronics to a gain value corresponding to the scan,
        rotating a collector to collect light to capture light from the source in a plane defined by the rotation of an entrance to the collector,
        detecting the light collected by the collector with the optical detector, and storing data acquired from a data signal from the device electronics, and wherein constructing a compiled far-field radiation profile comprises:

assigning data from a scan of the set of far-field scans acquired with the lowest gain setting of the variable gain amplifier with a data value greater than a threshold value to a central region of the compiled far-field radiation profile, and assigning data from remaining scans of the set of far-field scans in order of gain setting with data values above the threshold value to various regions of the compiled far-field radiation profile so that the compiled far-field radiation profile is completely filled.

26. The method of claim 25, further including calculating the Mode-Field Diameter from the compiled far-field radiation profile.

27. The method of claim 25, further including calculating the Effective Area of the optical fiber.

28. The method of claim 25, further including calculating the Numerical Aperture of the optical fiber.

29. The method of claim 25, further including constructing a compiled far-field radiation profile for each of a set of selected angular positions of the source and constructing a three-dimensional far-field radiation profile by combining the compiled far-field radiation profile for each of the set of selected angular positions of the source.

30. The method of claim 29, wherein the set of selected angular positions of the source correspond to rotational positions in the plane defined by the rotation of the entrance of the collector.

31. The method of claim 29, wherein the set of selected angular positions of the source correspond to rotational positions of an entrance mirror reflecting light from the source into the plane defined by the rotation of the entrance of the collector.

* * * * *